(12) United States Patent
Pippin

(10) Patent No.: US 7,761,274 B1
(45) Date of Patent: *Jul. 20, 2010

(54) TEMPERATURE-BASED CLOCK FREQUENCY CONTROLLER APPARATUS AND METHOD

(75) Inventor: Jack D. Pippin, Portland, OR (US)

(73) Assignee: Intel Corporation, Santa Clara, CA (US)

(*) Notice: Subject to any disclaimer, the term of this patent is extended or adjusted under 35 U.S.C. 154(b) by 2617 days.

This patent is subject to a terminal disclaimer.

(21) Appl. No.: 09/707,486

(22) Filed: Nov. 7, 2000

Related U.S. Application Data

(60) Division of application No. 09/093,988, filed on Jun. 8, 1998, now abandoned, which is a continuation of application No. 08/660,016, filed on Jun. 6, 1996, now Pat. No. 5,838,578, which is a continuation of application No. 08/124,980, filed on Sep. 21, 1993, now abandoned.

(51) Int. Cl.
*G06F 17/50* (2006.01)

(52) U.S. Cl. .................. 703/14; 327/307; 307/117; 702/132; 716/4; 714/E11.018; 361/103

(58) Field of Classification Search .......... 307/409, 307/117, 417; 703/2, 13, 14; 716/1, 4; 702/132; 714/E11.018; 327/307, 512; 361/103
See application file for complete search history.

(56) References Cited

U.S. PATENT DOCUMENTS

| 3,383,614 A | 5/1968 | Emmons et al. |
| 3,843,872 A | 10/1974 | Shimomura |

(Continued)

FOREIGN PATENT DOCUMENTS

DE  3516989  11/1986

(Continued)

OTHER PUBLICATIONS

English Translation of Power Control Circuit, Kokai Patent Application HEI 2[1990]-83720, N. Nakagawa, Mar. 23, 1990, entire document.*

(Continued)

*Primary Examiner*—Russell Frejd
(74) *Attorney, Agent, or Firm*—Rothwell, Figg, Ernst & Manbeck, P.C.

(57) ABSTRACT

A temperature-based clock frequency controller is implemented in an integrated circuit such as a microprocessor. The temperature-based clock frequency controller includes a register to store a threshold temperature value, a thermal sensor, and clock adjustment logic to decrease a clock frequency in response to the thermal sensor indicating that the threshold temperature value has been exceeded. In a microprocessor implementation, the microprocessor contains a plurality of thermal sensors each placed in one of a plurality of different locations across the integrated circuit and an averaging mechanism to calculate an average temperature from the plurality of thermal sensors. Threshold adjustment logic increases the threshold temperature value to a new threshold temperature value in response to the thermal sensor indicating that the threshold temperature value has been exceeded. Threshold adjustment logic further lowers the new threshold temperature to detect decreases in temperature. In addition, the microprocessor contains halt logic that halts operation of the microprocessor when the temperature attains a critical temperature.

32 Claims, 11 Drawing Sheets

U.S. PATENT DOCUMENTS

| | | | |
|---|---|---|---|
| 3,980,505 A | 9/1976 | Buckley | |
| 4,204,249 A | 5/1980 | Dey et al. | |
| 4,432,031 A | 2/1984 | Premerlani | 361/97 |
| 4,442,972 A | 4/1984 | Sahay et al. | 236/1 EA |
| 4,488,824 A | 12/1984 | Salem | 374/181 |
| 4,557,223 A | 12/1985 | Gueyen | |
| 4,591,855 A | 5/1986 | Blackburn | 340/870.13 |
| 4,602,872 A | 7/1986 | Emery et al. | |
| 4,636,092 A | 1/1987 | Hegyi | |
| 4,667,121 A | 5/1987 | Fay et al. | |
| 4,669,025 A | 5/1987 | Barker | |
| 4,680,527 A | 7/1987 | Benenati | |
| 4,740,664 A | 4/1988 | Payne | |
| 4,751,405 A | 6/1988 | Bufano, Jr. et al. | 307/350 |
| 4,779,161 A | 10/1988 | DeShazo, Jr. | 361/106 |
| 4,786,847 A | 11/1988 | Daggett et al. | |
| 4,787,007 A | 11/1988 | Matsumura et al. | 364/98 |
| H562 H | 12/1988 | Trachier et al. | |
| 4,789,819 A | 12/1988 | Nelson | 323/314 |
| 4,799,176 A | 1/1989 | Cacciotore | 364/557 |
| 4,807,144 A | 2/1989 | Joehlin et al. | 364/473 |
| 4,823,292 A | 4/1989 | Hillion | |
| 4,833,708 A | 5/1989 | Goodrich | |
| RE32,960 E | 6/1989 | Levine | |
| 4,848,090 A | 7/1989 | Peters | |
| 4,851,987 A | 7/1989 | Day | 395/560 |
| 4,893,097 A | 1/1990 | Zwack | 331/176 |
| 4,903,106 A | 2/1990 | Fukunaga et al. | 357/43 |
| 4,924,112 A | 5/1990 | Anderson et al. | 326/32 |
| 4,935,864 A | 6/1990 | Schmidt et al. | 363/141 |
| 4,970,497 A | 11/1990 | Broadwater | |
| 5,008,771 A | 4/1991 | Palara | 361/103 |
| 5,021,679 A | 6/1991 | Fairbanks et al. | |
| 5,025,248 A | 6/1991 | Bergeron | 340/596 |
| 5,025,387 A | 6/1991 | Frane | |
| 5,039,878 A | 8/1991 | Armstrong et al. | |
| 5,064,296 A | 11/1991 | Huijsing et al. | 374/163 |
| 5,077,491 A | 12/1991 | Heck et al. | 307/354 |
| 5,085,526 A | 2/1992 | Sawtell et al. | 374/101 |
| 5,086,501 A | 2/1992 | DeLuca et al. | |
| 5,087,870 A | 2/1992 | Salesky et al. | 323/276 |
| 5,105,366 A | 4/1992 | Beckey | 364/505 |
| 5,146,544 A | 9/1992 | Altham et al. | |
| 5,149,199 A | 9/1992 | Kinoshita | 374/175 |
| 5,167,024 A | 11/1992 | Smith et al. | |
| 5,170,344 A | 12/1992 | Berton et al. | 364/400 |
| 5,189,314 A | 2/1993 | Georgiou et al. | 307/271 |
| 5,189,647 A | 2/1993 | Suzuki et al. | |
| 5,195,827 A | 3/1993 | Audy et al. | 374/172 |
| 5,201,059 A | 4/1993 | Nguyen | |
| 5,201,862 A | 4/1993 | Pettitt | |
| 5,204,863 A | 4/1993 | Saint-Joigny et al. | |
| 5,218,704 A | 6/1993 | Watts, Jr. et al. | |
| 5,222,239 A | 6/1993 | Rosch | |
| 5,230,055 A | 7/1993 | Katz et al. | |
| 5,233,161 A | 8/1993 | Farwell et al. | |
| 5,239,652 A | 8/1993 | Seibert et al. | |
| 5,253,938 A | 10/1993 | Stixrud | 374/173 |
| 5,254,888 A | 10/1993 | Lee et al. | |
| 5,255,149 A | 10/1993 | Matsuo | |
| 5,283,631 A | 2/1994 | Koerner et al. | 307/451 |
| 5,283,661 A | 2/1994 | Klees | |
| 5,285,347 A | 2/1994 | Fox | |
| 5,287,292 A | 2/1994 | Kenny et al. | |
| 5,291,607 A | 3/1994 | Ristic et al. | |
| 5,325,256 A | 6/1994 | Miyazaki et al. | 364/557 |
| 5,359,234 A * | 10/1994 | Atriss et al. | 327/513 |
| 5,359,236 A | 10/1994 | Giordano et al. | 307/310 |
| RE34,789 E | 11/1994 | Fraden | |
| 5,379,230 A | 1/1995 | Morikawa | |
| 5,381,700 A | 1/1995 | Grosskopf | |
| 5,422,832 A | 6/1995 | Moyal | 364/557 |
| 5,424,764 A | 6/1995 | Yamaguchi | |
| 5,440,305 A | 8/1995 | Signore et al. | 341/120 |
| 5,444,637 A | 8/1995 | Smesny | |
| 5,451,860 A | 9/1995 | Khayat | |
| 5,451,892 A | 9/1995 | Bailey | 327/113 |
| 5,453,682 A | 9/1995 | Hinrichs et al. | 324/132 |
| 5,455,510 A | 10/1995 | Nelson | |
| 5,477,417 A * | 12/1995 | Ohmori et al. | 361/695 |
| 5,483,102 A | 1/1996 | Neal et al. | 257/712 |
| 5,485,127 A | 1/1996 | Bertoluzzi et al. | 331/69 |
| 5,490,059 A | 2/1996 | Mahalingaiah et al. | 364/166 |
| 5,560,017 A | 9/1996 | Barrett et al. | 395/733 |
| 5,586,270 A | 12/1996 | Rotier et al. | 395/282 |
| 5,596,514 A | 1/1997 | Maher | |
| 5,612,672 A | 3/1997 | Ino | |
| 5,902,044 A | 6/1997 | Pricer | |
| 5,664,201 A | 9/1997 | Ikedea | |
| 5,688,116 A | 11/1997 | Kobayashi | |
| 5,710,929 A | 1/1998 | Fung | |
| 5,723,998 A | 3/1998 | Saito et al. | 327/513 |
| 5,752,011 A | 5/1998 | Thomas et al. | |
| 5,764,601 A | 6/1998 | Murakami | |
| 5,798,667 A | 8/1998 | Herbert | 327/513 |
| 5,805,403 A | 9/1998 | Chemla et al. | |
| 5,808,438 A | 9/1998 | Jeffrey | |
| 5,838,578 A | 11/1998 | Pippin | 364/488 |
| 5,848,486 A | 12/1998 | Mitchell | |
| 5,870,267 A | 2/1999 | Kitano | |
| 5,884,068 A | 3/1999 | Conary et al. | |
| 6,363,490 B1 | 3/1999 | Senyk | |
| 5,974,557 A | 10/1999 | Thomas et al. | |
| 6,006,169 A | 12/1999 | Sandhu | |
| 6,029,119 A | 2/2000 | Atkinson | |
| 6,055,489 A | 4/2000 | Beatty | |
| 6,061,221 A | 5/2000 | Tihanyi | |
| 6,078,209 A | 6/2000 | Linoff | |
| 6,079,626 A | 6/2000 | Hartman | |
| 6,094,026 A | 7/2000 | Cameron | |
| 6,112,164 A | 8/2000 | Hobson | |
| 6,134,667 A | 10/2000 | Suzuki | |
| 6,140,860 A | 10/2000 | Sandhu | |
| 6,172,342 B1 | 1/2001 | Khafagy | |
| 6,194,858 B1 | 2/2001 | Chen | |
| 6,215,405 B1 | 4/2001 | Handley | |
| 6,216,235 B1 | 4/2001 | Thomas | |
| 6,225,851 B1 | 5/2001 | Descombes | |
| 6,233,190 B1 | 5/2001 | Cooper | |
| 6,272,313 B1 | 8/2001 | Arsenault | |
| 6,276,202 B1 | 8/2001 | Latarius | |
| 6,285,245 B1 | 9/2001 | Watanabe | |
| 6,321,175 B1 | 11/2001 | Nagaraj | |
| 6,336,080 B1 | 1/2002 | Atkinson | |
| 6,361,466 B1 | 3/2002 | Kyrtsos | |
| 6,363,029 B1 | 3/2002 | Watanabe et al. | |
| 6,375,624 B1 | 4/2002 | Uber | |
| 6,388,853 B1 | 5/2002 | Balakrishnan | |
| 6,393,374 B1 | 5/2002 | Rankin | |
| 6,403,036 B1 | 6/2002 | Rodgers | |
| 6,412,294 B2 | 7/2002 | Kimura | |
| 6,442,500 B1 | 8/2002 | Kim | |
| 6,442,700 B1 | 8/2002 | Cooper | |
| 6,446,213 B1 | 9/2002 | Yamaki | |
| 6,452,291 B1 | 9/2002 | Erickson | |
| 6,457,135 B1 | 9/2002 | Cooper | |
| 6,463,396 B1 | 10/2002 | Nishigaki | |
| 6,470,289 B1 | 10/2002 | Peters | |
| 6,484,117 B1 | 11/2002 | Wohlfarth | |
| 6,487,667 B1 | 11/2002 | Thomas et al. | |
| 6,487,668 B2 | 11/2002 | Thomas | |
| 6,501,776 B1 | 12/2002 | Numai | |
| 6,516,781 B2 | 2/2003 | Weisman | |
| 7,167,993 B1 | 1/2007 | Thomas et al. | |

| 7,293,186 | B2 | 11/2007 | Thomas et al. |
| 2003/0212474 | A1 | 11/2003 | Pippin |

FOREIGN PATENT DOCUMENTS

| EP | 0523736 A1 | 1/1993 |
| EP | 573651 | 12/1993 |
| EP | 0683558 A1 | 11/1995 |
| EP | 0821459 | 1/1998 |
| JP | 04038431 A | 2/1992 |
| JP | 04276807 A | 10/1992 |
| JP | 10-93010 | 4/1998 |
| JP | 11-48769 | 2/1999 |

OTHER PUBLICATIONS

Dynamic Power Management by Clock Speed Variation, IBM Technical Disclosure Bulletin, vol. 32, No. 8B, Jan. 1990.*
Automatically Controlled Air Cooling System for Small Machines, IBM Technical Disclosure Bulletin, Jan. 1982.*
Willett et al., Pentium May be Too Hot for Ungradeable Systems, InfoWorld, vol. 15, No. 20, pp. 1 and 105 (May 17, 1993).*
Intel Corporation, "Advanced Power Management (APM)- BIOS Interface Specification," Revision 1.2, Feb. 1996.
G. H. Forman & J. Zahorjan, University of Washington; *The Challenges of Mobile Computing*; Apr. 1994; pp. 38-47.
R. Patton, Electronics; *Intelligent Power Manager Cools Pentium*; Sep. 27, 1993; 1 page.
S.C. Ellis, Intel Corporation; *The Low Power INTEL486™ SL Microprocessor*; 1993 IEEE; pp. 96-102.
*ISSCC 93/Evening Discussion Session/WE 5*; 1993IEEE; pp. 202-203.
J. Circello & F. Goodrich; *The Motorola 68060 Microprocessor*; 1993 IEEE; pp. 73-78.
J. Novitsky, M. Azimi et al; *Optimizing Systems Perfomance Based on Pentium™ Processors*, Intel Corporation, Santa Clara, CA; pp. 63-72.
A. Saini; *An Overview of the Intel Pentium™ Processor*; Intel Corp. Santa Clara, CA 1993 IEEE; pp. 6062.
M. Jerome; *PC-Computing-Perfectly Portable PCs*; Nov. 1, 1993; pp. 1-9.
*Figure 2. x86 Processor Interoductions: Now*; COMPCON Feb. 1994; 1-pg.
D. Stoenner AMD Application Note; *EZ-030 Demonstration Board Theory of Operation*; Jan. 1994; 15 Pages.
S.R. Boyle et al; *A CMOS Circuit for Real-Time Chip Termperature Measurement*; 1994 IEEE; pp. 286-291.
*Versa S Series User's Guide*; May 1994; 178 pps.
R. S. Anthony; PC Magazine 114, vol. 13, No. 7, ISSN: 0888-8507; *Unleashing the Power of Pentium*; Apr. 12, 1994; pp. 1-14.
B. Nadel et al; PC Magazine 114, vol. 13, No. 8, ISSN: 0888-8507; *Power to the PC*; Apr. 26, 1994; pp. 1-15.
PC User; *486 Mono Notebooks*; Jan. 26, 1994; pp. 1-14.
PC User 37; *Battle for the Desktop: DX4 Notebooks*; May 4, 1994; pp. 1-4.
S. Gary et al; IEEE Design & Test of Computers; *PowerPC 603, A Microprocessor for Portable Computers*; 1994-Winter; pp. 14-23.
Windows Sources vol. 2, No. 1, ISSN: 1065-9641; *Well Connected Notebooks: Full Speed Ahead*; Jan. 1, 1994; 4 pages.
Communication of the ACM; *PowerPC 603 Microprocessor Power Management*; Jun. 1994, pp. 43-46.

G. Paap; PowerPC™ *A Performance Architecture*; 1993 IEEE; pp. 104-108.
Toshiba America Information Systems Inc.; *T5100 (no longer manufactured)*; Jun. 2, 1994; 4 pages.
Toshiba America Information Systems Inc.; *T8500 (no longer manufactured)*; Jun. 3, 1994; 3 pages.
Toshiba America Information Systems Inc.; *T4600, T4600C (Currently available with 20MB or 320MB hard drives; 120MB models no longer manufactured)*; Jun. 2, 1994; 6 pages.
Toshiba America Information Systems Inc.; *T1200F/FB/H/HB (no longer manufactured)*; May 20, 1994; 5 pages.
Power PC; *Advance Information PowerPC™ 603 RISC Microprocessor Technical Summary*; 1994, portions © 1991-94; 30 pages.
Power PC; *Advance Information PowerPC™ 604 RISC Microprocessor Technical Summary*; 1994, portions © 1991-94; 34 pages.
National Science Foundation; *Summary of Awards for the MIPS Division*; 1993; 120 Pages.
Pentium™ Family User's Manual/int$_e$l®, vol. 3; *Architecture and Programming Manual*; 1994; 8 pages.
Pentium™ Family User's Manual/int$_e$l®, vol. 1; *Data Book*; 1994; 15 pages.
Pentium™ Family User's Manual/int$_e$l®, vol. 2; *82496/82497 Cache Controller and 82491/82492 Cache SRAM Data Book*; 1994; 2 pages.
HP Virtual Museum: Hewlett-Packard Omnibook 300, 1993 (web page) *HP Omnibook 300, 1993-Six Views*; www.hp.com/hpinfo/about; Jan. 10, 2005; 1-page.
Idea '93; Conference Record Moscone Convention Center San Francisco, CA; *Notebook Computer Power Management Strategies Employing Programmable Logic Devices (PDLs)*; Sep. 28-30, 1993; 8 pages.
J.A. Martins et al; *Intergrated Management System for Interconnected Local Area Networks*; 1991 IEEE; pp. 1113-1116.
TDB; *High Power LSI Performance Optimizer*; Jan. 1991; 2 pages.
APM Specification, Intel Corporation Microsoft Corporation; Rev. 1.2; *Advanced Power Management (APM) Bios Interface Specification*; Feb. 1996; 79 pages.
U.S. Appl. No. 08/124,980, filed Sep. 21, 1993, (Abandoned).
U.S. Appl. No. 08/401,473, filed Mar. 9, 1995, (Abandoned).
U.S. Appl. No. 09/093,988, filed Jun. 8, 1998, (Abandoned).
U.S. Appl. No. 09/707,448, (Pending).
U.S. Appl. No. 09/707,486, (Pending).
Pippin Family Tree.
Chin, Shu-Yuan and Chung-Yu Wu, A New Type of Curvature-Compensated CMOS Bandgap Voltage References, VLSITSA, 1991, pp. 398-402.
Ferro, Marco, Franco Salerno and Rinaldo Castello, "A Floating CMOS Bandgap Voltage Reference for Differential Applications", IEEE: Journal of Solid-State Circuits, vol. 24, No. 3, Jun. 1989, pp. 690-697.
Salminen, O. and K. Halonen, "The Higher Order Temperature Compensation of Bandgap Voltage References", IEEE, 1992, pp. 1388-1391.
Allen and Holberg, "CMOS Analog Circuit Design", H.P.W., pp. 539-549, 1987.
Analog Devices, Low Power, Programmable Temperature Controller, pp. 1-16, 1995.
Sanchez et al., "Thermal Management System for High Performance PowerPC Microprocessors", pp. 325-330, 1997.

* cited by examiner

TEMPERATURE-BASED CLOCK FREQUENCY CONTROLLER APPARATUS AND METHOD

CROSS-REFERENCE TO RELATED APPLICATIONS

This application is a division of prior application Ser. No. 09/093,988 filed Jun. 8, 1998, now abandoned, which is a continuation of prior application Ser. No. 08/660,016, filed Jun. 6, 1996, issued as U.S. Pat. No. 5,838,578 on Nov. 17, 1998, which is a continuation of prior application Ser. No. 08/124,980, filed Sep. 21, 1993, now abandoned, all entitled "Method and Apparatus for Programmable Thermal Sensor for an Integrated Circuit" and all assigned to the assignee of the present application.

FIELD OF THE INVENTION

The present invention relates to thermal sensing, and more specifically to methods and apparatus for a programmable thermal sensor in an integrated circuit.

ART BACKGROUND

Advances in silicon process technology has lead to the development of increasingly larger die sizes for integrated circuits. The large dies sizes permit integration of millions of transistors on a single die. As die sizes for integrated circuits become larger, the integrated circuits consume more power. In addition, advances in microprocessor computing require execution of a large number of instructions per second. To execute more instructions per second, the microprocessor circuits operate at an increased clock frequency. Therefore, a microprocessor containing over one million transistors may consume over 30 watts of power. With large amounts of power being dissipated, cooling becomes a problem.

Typically, integrated circuits and printed circuit boards are cooled by either active or passive cooling devices. A passive cooling device, such as a heat sink mounted onto an integrated circuit, has a limited capacity to dissipate heat. An active cooling device, such as a fan, is used to dissipate larger amounts of heat. Although a fan cooling system dissipates heat, there are several disadvantages associated with such a system. Traditionally, fans cool integrated circuits by air convection circulated by a fan. However, when a fan is used in conjunction with a high density multi-chip computer system, a large volume of air is required for cooling thereby necessitating powerful blowers and large ducts. The powerful blowers and large ducts implemented in the computer occupy precious space and are too noisy. The removal of a cover or other casing may result in a disturbance of air flow causing the fan cooling system to fail. In addition, the fan cooling system is made up of mechanical parts that have a mean time between failure (MTBF) specification less than a typical integrated circuit. Furthermore, fan cooling systems introduce noise and vibration into the system.

In addition to cooling systems, thermal sensors are implemented to track the temperature of an integrated circuit or electronic system. Typically, thermal sensors consist of a thermocouple which is directly attached to a heat sink. In more sophisticated thermal sensing systems, a diode and external analog circuitry are used. In operation, the voltage/current characteristics of the diode change depending upon the temperature of the integrated circuit, and the external analog circuitry measures the voltage or current characteristics of the diode. The additional analog circuitry is complex and difficult to implement. In addition, employing the analog circuitry results in a thermal time delay degrading the accuracy of such a configuration. Moreover, external analog circuitry for sensing the voltage of the diode consumes a larger area than the integrated circuit being sensed. Therefore, it is desirable to provide a thermal sensor which is incorporated into the integrated circuit. In addition, it is desirable to provide a thermal sensor that can provide feedback for an active cooling system. Furthermore, it is desirable to control the temperature of an integrated circuit without the use of a fan. The present invention provides an integrated thermal sensor that detects a threshold temperature so that active cooling of the integrated circuit is accomplished through system control.

SUMMARY OF THE INVENTION

A programmable thermal sensor is implemented in an integrated circuit. The programmable thermal sensor monitors the temperature of the integrated circuit, and generates an output to indicate that the temperature of the integrated circuit has attained a predetermined threshold temperature. The programmable thermal sensor contains a voltage reference, a programmable $V_{be}$, a current source, and a sense amplifier or comparator. The current source generates a constant current to power the voltage reference and the programmable $V_{be}$. With a constant current source, the voltage reference generates a constant voltage over varying temperatures and power supply voltages. In a preferred embodiment, the voltage reference is generated with a silicon bandgap reference circuit. The constant voltage from the voltage reference is one input to the sense amplifier. The programmable $V_{be}$ contains a sensing portion and a multiplier portion. In general, the programmable $V_{be}$ generates a voltage dependent upon the temperature of the integrated circuit and the value of programmable inputs. The programmable inputs are supplied to the multiplier portion to generate a multiplier value for use in the multiplier portion. The voltage reference is compared with the voltage generated by the programmable $V_{be}$ in the sense amplifier. The sense amplifier generates a greater than, less than, signal.

The programmable thermal sensor of the present invention is implemented in a microprocessor. In addition to the programmable thermal sensor, the microprocessor contains a processor unit, an internal register, microprogram and clock circuitry. The processor unit incorporates the functionality of any microprocessor circuit. The clock circuitry generates a system clock for operation of the microprocessor. In general, the microprogram writes programmable input values to the internal register. The programmable input values correspond to threshold temperatures. The programmable thermal sensor reads the programmable input values, and generates an interrupt when the temperature of the microprocessor reaches the threshold temperature. In a first embodiment, the interrupt is input to the microprogram and the processor unit. In response to an interrupt, the processor unit may take steps to cool the temperature of the microprocessor, and the microprogram programs a new threshold temperature. For example, the processor may turn on a fan or reduce the clock frequency. The new threshold temperature is slightly higher than the current threshold temperature so that the processor unit may further monitor the temperature of the microprocessor.

In a second embodiment of the present invention, the interrupt generated by the programmable thermal sensor is input to external sensor logic. The external sensor logic automatically controls the frequency of the microprocessor. If the temperature of the microprocessor raises, then the clock frequency is decreased. Conversely, if the temperature of the microprocessor drops, then the system clock frequency is increased. In addition to a programmable thermal sensor, the microprocessor contains a fail safe thermal sensor. The fail safe thermal sensor generates an interrupt when detecting that the microprocessor reaches pre-determined threshold temperatures and subsequently halts operation of the system clock. The predetermined threshold temperature is selected below a temperature that causes physical damage to the device. The microprocessor of the present invention is implemented in a computer system. Upon generation of an interrupt in the programmable thermal sensor, a message containing thermal sensing information is generated and displayed to a user of the computer system.

BRIEF DESCRIPTION OF THE DRAWINGS

The objects, features, and advantages of the present invention will be apparent from the following detailed description of the preferred embodiment of the invention with references to the following drawings.

NOTION AND NOMENCLATURE

Figure 1:
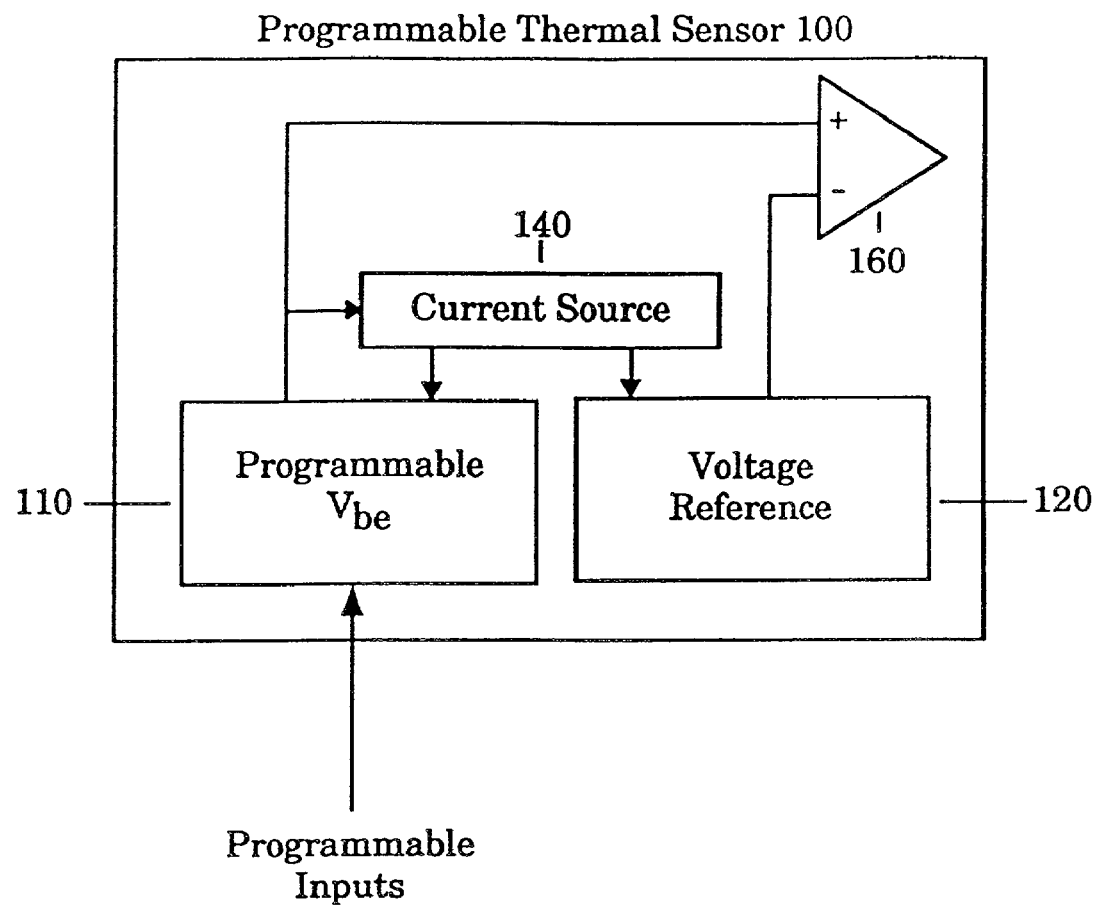
FIG. 1 illustrates a block diagram of a programmable thermal sensor configured in accordance with the present invention.

The detailed descriptions which follow are presented, in part, in terms of algorithms and symbolic representations of operations within a computer system. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below. Machines which may perform the functions of the present invention include those manufactured by Intel Corporation, as well as other manufacturers of computer systems.

DETAILED DESCRIPTION

Methods and apparatus for thermal sensing in an integrated circuit are disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

Referring to FIG. 1, a block diagram of a programmable thermal sensor configured in accordance with the present invention is illustrated. In general, a programmable thermal sensor 100 monitors the temperature of an integrated circuit, and generates an output to indicate that the temperature of the integrated circuit has attained a predetermined threshold temperature. The programmable thermal sensor 100 contains a voltage reference 120, a programmable $V_{be}$ 110, a current source 140, and a sense amplifier 160. The current source 140 generates a constant current to power the voltage reference 120 and the programmable $V_{be}$ 110. With a constant current source, the voltage reference 120 generates a constant voltage over varying temperatures and power supply voltages (Vcc). In a preferred embodiment, the voltage reference is generated with a silicon bandgap reference circuit. The constant voltage from the voltage reference 120 is input to the sense amplifier 160. The programmable $V_{be}$ 110 contains a sensing portion and a multiplier portion. In general, the programmable $V_{be}$ 110 generates a voltage dependent upon the temperature of the integrated circuit and the value of programmable inputs. The programmable inputs are supplied to the multiplier portion to generate a multiplier value for use in the multiplier portion.

Figure 2:
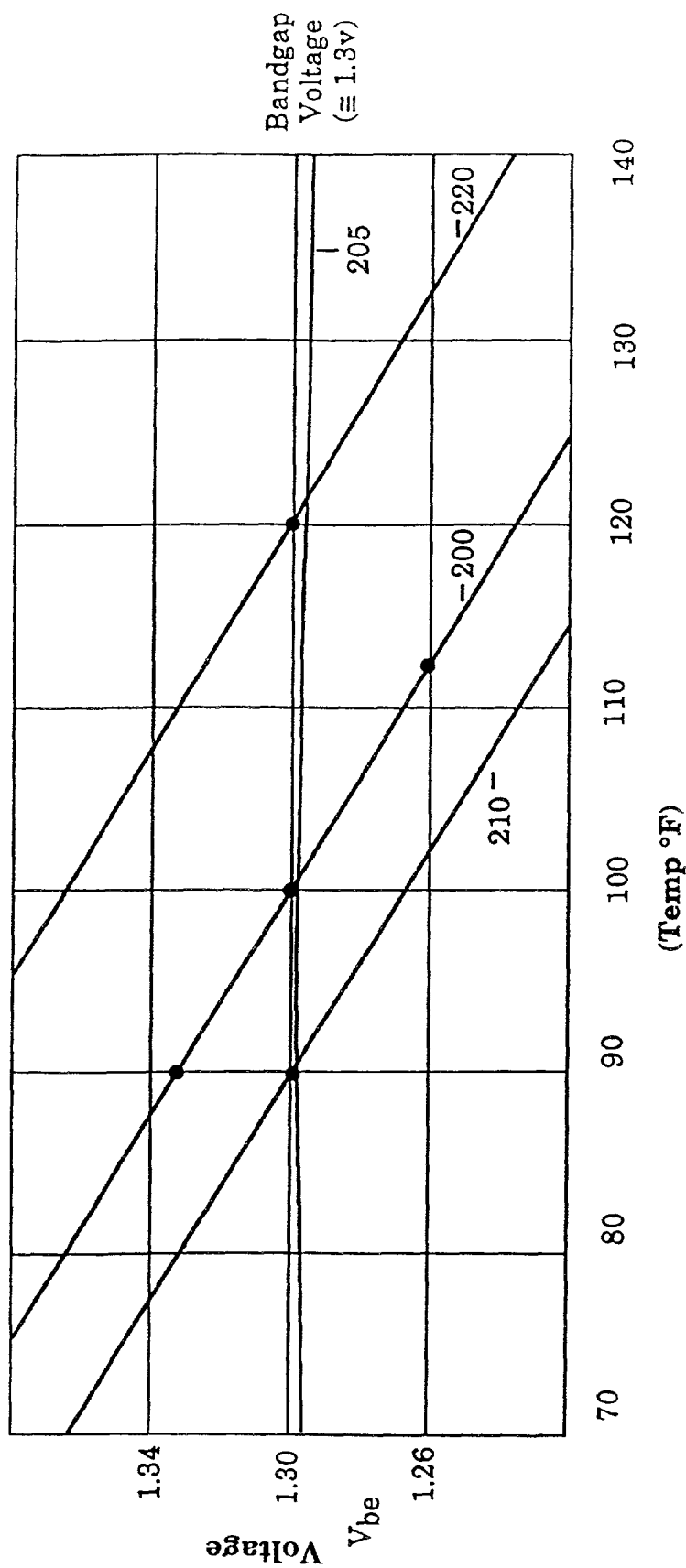
FIG. 2 illustrates a graph depicting the relationship between the base-emitter voltage ($V_{be}$) of a bipolar transistor versus the temperature of the supply voltage.

Referring to FIG. 2, a graph depicting the relationship between the base-emitter voltage ($V_{be}$) of a bipolar transistor versus temperature is illustrated. A characteristic curve 200 on the graph of FIG. 2 shows the linear characteristics of the $V_{be}$ voltage over a temperature range of 70 degrees Fahrenheit (70° F.) to 140° F. In addition, the graph of FIG. 2 shows a relative constant bandgap voltage curve 205 over the specified temperature range. Although the bandgap voltage varies slightly over the temperature range, the variation of the bandgap voltage is negligible compared to the variation of the $V_{be}$ voltage over the temperature range. As shown by the curve 205 in FIG. 2, the bandgap voltage is equal to approximately 1.3 volts (V). When the $V_{be}$ voltage equals 1.3 volts, the temperature of the integrated circuit is 100° F. Based on the linear temperature characteristics of the $V_{be}$ voltage, and the relatively constant bandgap voltage over the temperature range, a thermal sensor is constructed.

For the voltage/temperature characteristics of line 200 shown in FIG. 2, the bandgap voltage equals the $V_{be}$ voltage when the integrated circuit is at 100° F. However, the $V_{be}$ voltage may be changed to sense additional temperature values in the integrated circuit. By shifting the linear $V_{be}$ voltage/temperature characteristic curve 200, any number of predetermined threshold temperature values are detected. To shift the voltage/temperature characteristic curve 200, the $V_{be}$ voltage is multiplied by pre-determined values to generate a new voltage for comparison to the bandgap voltage. Specifically, to shift the characteristic curve 200 to sense a voltage less then 100° F., the $V_{be}$ voltage is multiplied by a fraction to generate a new characteristic curve, such as the characteristic curve 210 shown in FIG. 2. The characteristic curve 210 exhibits the same slope as the original characteristic curve 200. However, for the characteristic curve 210, the $V_{be}$ voltage is equal to the bandgap voltage when the integrated circuit temperature equals 90° F. Similarly, the $V_{be}$ voltage may be multiplied by a value greater than 1 to generate a characteristic curve such as the characteristic curve 220 shown in FIG. 2. The characteristic curve 220 also exhibits the same slope as the original characteristic curve 200. However, the characteristic curve 220 intersects the bandgap voltage curve 205 at 120° F. Consequently, any number of threshold temperatures are detectable by multiplying the $V_{be}$ voltage by a predetermined constant.

Figure 3:
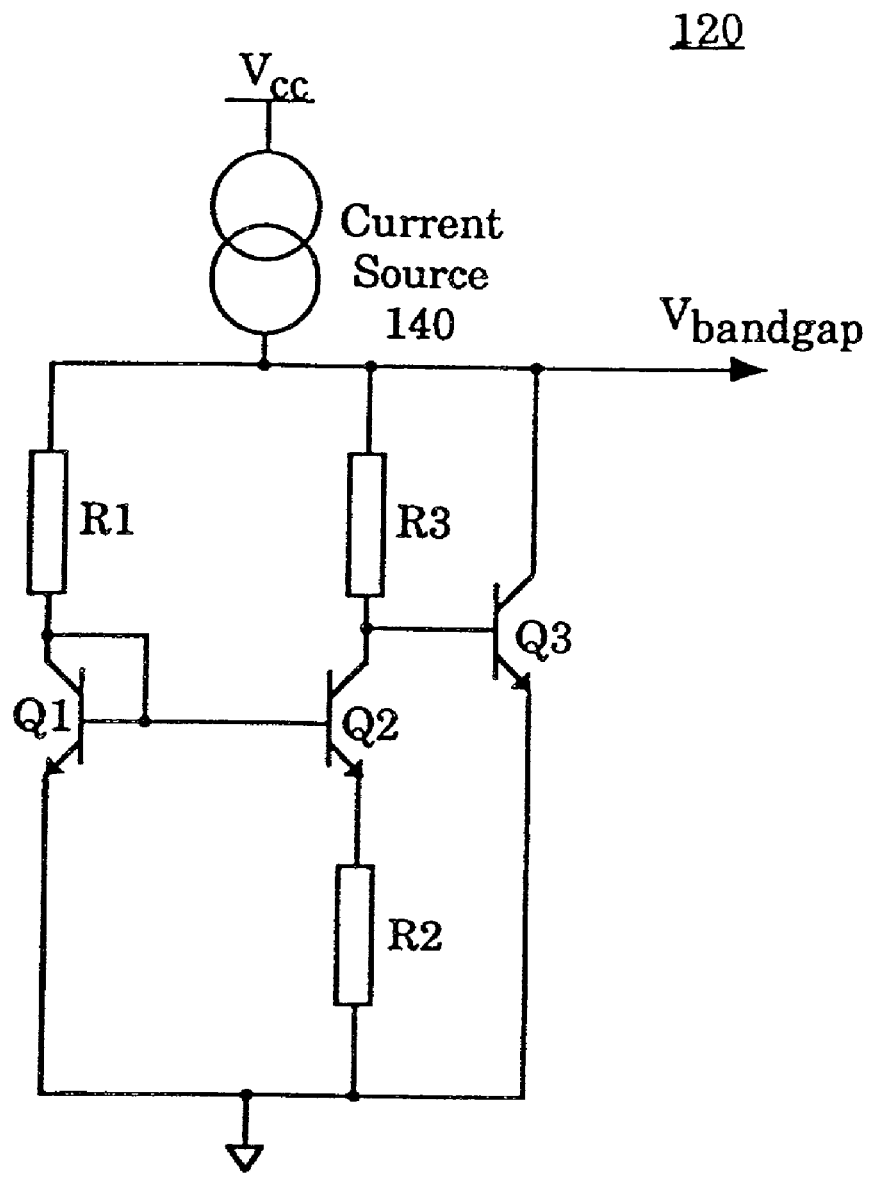
FIG. 3 illustrates a bandgap reference circuit configured in accordance with the present invention.

Referring to FIG. 3, a bandgap reference circuit configured in accordance with the present invention is illustrated. The bandgap reference circuit 120 is powered from a voltage source, Vcc. The voltage source Vcc is regulated by a current source such that the current source 140 supplies a constant current over a wide range of Vcc voltages. A preferred embodiment of the present invention for the current source 140 is described fully below. The bandgap reference circuit 120 contains three N-P-N bipolar transistors Q1, Q2 and Q3, and three resistive elements R1, R2 and R3. In general, the constant bandgap reference voltage, $V_{bandgap}$, is generated at the collector of N-P-N transistor Q3. The bipolar transistors Q1, Q2 and resistive elements R1, R2 and R3 are provided to compensate for temperature variations in the base to emitter junction voltage ($V_{be}$) of bipolar transistor Q3. Specifically, the resistive element R1 is coupled from the current source 140 to the collector of bipolar transistor Q1. The collector and base of bipolar transistor Q1 are shorted so that Q1 is effectively a P-N junction diode. The base of transistor Q1 and the base of transistor Q2 are coupled together. The resistive element R3 couples the collector of transistor Q2 to the current source 140, and the resistive element R2 couples the emitter of transistor Q2 to ground. In a preferred embodiment of the present invention, the resistive element R1 equals 4800 ohms, the resistive element R2 equals 560 ohms, and the resistive element R3 equals 4800 ohms.

In operation, the voltage at the base of transistors Q1 and Q2 are pulled to the $V_{bandgap}$ voltage through the R1 resistance. Therefore, the transistors Q1 and Q2 are biased in the active region, thereby allowing current to flow from the collector to the emitter of transistors Q1 and Q2. The mirrored configuration of transistors Q1 and Q2 tends to drive the base to emitter voltage ($V_{be}$) of transistors Q1 and Q2 equivalent. However, the resistive element R2 increases the resistance at the emitter of transistor Q2, resulting in a greater current density flowing through transistor Q1 than flowing through transistor Q2. As the temperature in the integrated circuit rises, the $V_{be}$ of transistor Q2 decreases. In turn, the decrease of $V_{be}$ on transistor Q2 causes a decrease in the current density flow through Q2. The decrease in current density through the resistive element R2 also causes a reduction in the current density flowing through the resistive element R3. Because the collector of transistor Q2 is coupled to the base of transistor Q3, a decrease in the current through resistive element R3 results in an increase in the voltage at the base of transistor Q3. Consequently, as the temperature of the integrated circuit rises, the $V_{be}$ across transistors Q1, Q2, and Q3 decreases. However, the decrease of $V_{be}$ on transistor Q3 is compensated by the increase of voltage at the base of transistor Q3. Therefore, regardless of temperature fluctuations, the $V_{bandgap}$ remains at a constant silicon bandgap voltage. For a further explanation of generation of a bandgap reference, including a theoretical derivation, see A. T. Brokaw, A Simple Three-Terminal IC Bandgap Reference, IEEE J. of Solid State Circuits, December, 1974, and Karel E. Kuijk, A Precision Reference Voltage Source, IEEE J. of Solid State Circuits, June 1973.

Figure 4:
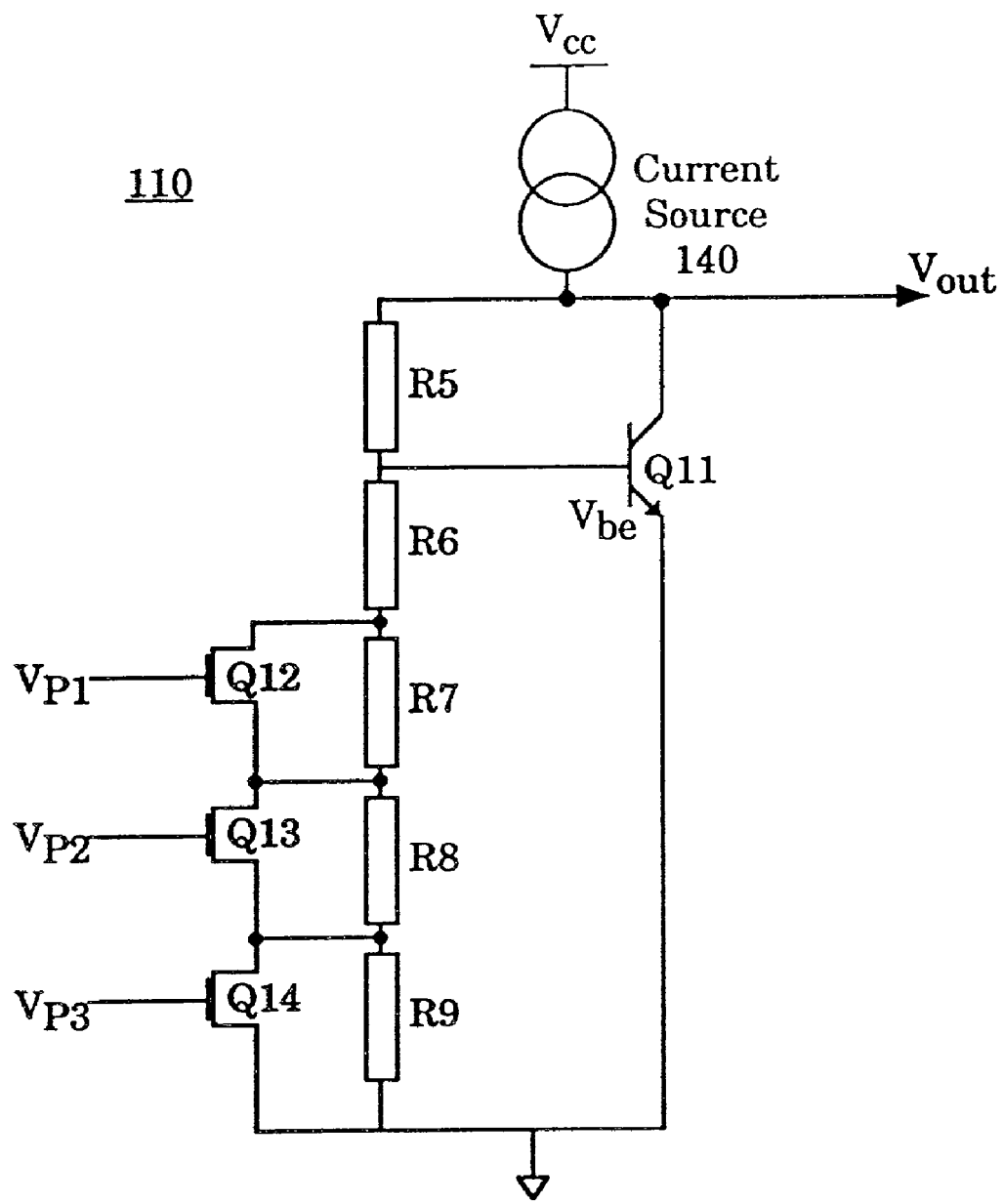
FIG. 4 illustrates a programmable base to emitter voltage ($V_{be}$) circuit configured in accordance with the present invention.

Referring to FIG. 4, a programmable base to emitter voltage ($V_{be}$) circuit configured in accordance with the present invention is illustrated. In a preferred embodiment of the present invention, a temperature varying voltage is generated from the characteristics of a base to emitter junction on a bipolar transistor. In general, the programmable $V_{be}$ circuit generates an output voltage, $V_{out}$, based on the $V_{be}$ voltage and the value of programmable input voltages $V_{p1}$, $V_{p2}$ and $V_{p3}$. A N-P-N bipolar transistor Q11 shown in FIG. 4 is utilized to generate the $V_{be}$ reference voltage. As described above, the $V_{be}$/temperature characteristic curve may be shifted along the temperature axis to detect a desired threshold temperature. By shifting the $V_{be}$/temperature characteristic curve along the temperature axis, a plurality of output voltages representing different threshold temperatures are generated.

To generate the $V_{out}$ for a particular threshold temperature, a programmable $V_{be}$ multiplier circuit is utilized. The programmable $V_{be}$ multiplier circuit contains resistive elements R5, R6, R7, R8, and R9, and metal oxide semiconductor field effect transistors (MOSFET) Q12, Q13, and Q14. In a preferred embodiment, Q12, Q13 and Q14 comprise N-MOS transistors. The drain terminal of transistor Q12 is coupled to a first input on resistive element R7, and the source of transistor Q12 is coupled to a second input on resistive element R7. The transistors Q13 and Q14 are similarly coupled to resistive elements R8 and R9, respectively. Programmable input voltages $V_{p1}$, $V_{p2}$, and $V_{p3}$ are input to the gate of transistors Q12, Q13 and Q14, respectively. The input voltages $V_{p1}$, $V_{p2}$, and $V_{p3}$ control the current flow by selecting either a resistive element or the respective MOS transistor.

In operation, the programmable $V_{be}$ multiplier circuit outputs a voltage, $V_{out}$, comprising a multiple of the base to emitter voltage on bipolar transistor Q11. For purposes of explanation, consider resistive elements R6, R7, R8 and R9 as one resistive element: R6-R9. The resistive element R6-R9 is connected across the base to emitter junction of bipolar transistor Q11. Therefore, the voltage drop across the resistive element R6-R9 is equivalent to $V_{be}$ of bipolar transistor Q11. The current flowing through resistive element R6-R9 is approximately equal to the current flowing through resistive element R5 minus the current flowing into the base of transistor Q11. Therefore, if the value of resistive element R5 is equal to the value of resistive element R6-R9, the voltage at the collector of transistor Q11 equals $2V_{be}$. In general, the $V_{out}$ voltage is defined by the following equation:

$$V_{out} = V_{R5} + V_{be}$$

$$V_{be} = V_{R6-R9}$$

$$V_{out} = V_{R5} + V_{R6-R9}$$

Therefore, $V_{out}$ values greater than 1 $V_{be}$ are generated by changing the ratio between resistive element R5 and resistive element R6-R9.

To move the $V_{be}$ curve 200 shown in FIG. 2 along the temperature axis via the programmable $V_{be}$ circuit 110, a combination of resistive elements R7, R8 and R9 are selected. To select a combination of resistive elements R7, R8 and R9, the voltages Vp1, Vp2, and Vp3 are applied to the gates of MOS transistors Q13, Q12, and Q14, respectively. The resistive elements R7, R8 and R9 are binary weighed resistors. Each individual resistor R7, R8 and R9 can be shorted through control by Q12, Q13 and Q14 respectively. By selecting resistive elements R7, R8 and R9 as series resistors with resistive element R6, the voltage $V_{out}$ is changed. In a preferred embodiment of the present invention, the resistive element R5 equals 6380, the resistive element R6 equals 5880, the resistive element R7 equals 392, the resistive element R8 equals 787, and the resistive element R9 equals 1568. By setting the resistive elements R5-R9 to the above values and programming the transistors Q13, Q12, and Q14, the voltage $V_{out}$ is generated to correspond to specific threshold temperatures. Specifically, Table 1 illustrates the threshold temperatures programmed in response to the input voltages Vp1, Vp2, and Vp3.

TABLE 1

| Vp1 | Vp2 | Vp3 | Threshold Temperature (Degrees C.) |
|---|---|---|---|
| 0 | 0 | 0 | 70° |
| 0 | 0 | 1 | 80° |
| 0 | 1 | 0 | 90° |
| 0 | 1 | 1 | 100° |
| 1 | 0 | 0 | 110° |
| 1 | 0 | 1 | 120° |
| 1 | 1 | 0 | 130° |
| 1 | 1 | 1 | 140° |

Figure 5:
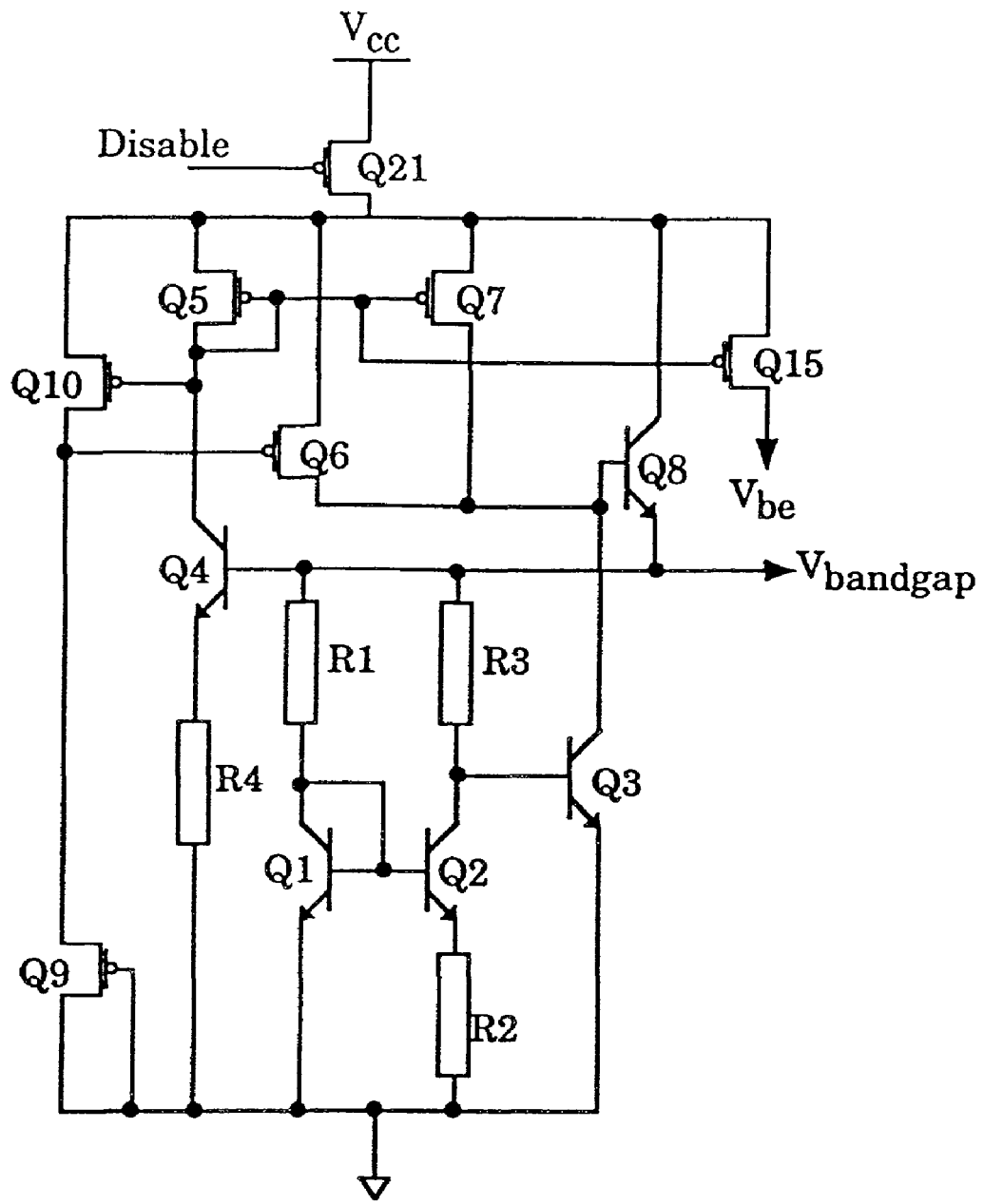
FIG. 5 illustrates a current source, including the bandgap reference circuit, configured in accordance with the present invention.

Referring to FIG. 5, a current source including the bandgap reference circuit configured in accordance with the present invention is illustrated. The bandgap reference circuit comprises resistors R1, R2, and R3 and bipolar transistors Q1, Q2, Q3 and Q8. The operation of the bandgap reference circuit 120 is described above. However, the bandgap reference circuit of FIG. 5 also incorporates a gain stage with bipolar transistor Q8. In order to incorporate a gain stage, the collector of bipolar transistor Q3 is coupled to the base of bipolar transistor Q8. The constant bandgap reference voltage generated at the collector of bipolar transistor Q3 controls the base of bipolar transistor Q8 resulting in a signal at the emitter of bipolar transistor Q8 containing a silicon bandgap voltage with increased current density. In addition to the bandgap reference circuit, FIG. 5 illustrates a constant current source 140 including a start-up circuit portion. The constant current source 140 comprises a bipolar transistor Q4, P-MOS transistors Q5, Q7 and Q15, and resistor R4. The constant current source 140 stabilizes operation of the thermal sensor of the present invention over a range of Vcc ranges.

In general, the constant current source 140 is derived from the generation of the constant bandgap reference voltage. In operation, the constant bandgap reference voltage, $V_{bandgap}$, is coupled to the base of bipolar transistor Q4. The constant bandgap reference voltage drives the bipolar transistor Q4 to generate a constant current flowing from the collector to the emitter of transistor Q4 and through the resistor R4. The P-MOS transistor Q5 is mirrored with P-MOS transistors Q7 and Q15. The constant current flowing through resistor R4 also flows through P-MOS transistor Q5 and is mirrored through P-MOS transistors Q7 and Q15. In a preferred embodiment, resistive element R4 equals 6020. The P-MOS transistor Q15 provides a constant current source for the programmable $V_{be}$ circuit 110. Similarly, P-MOS transistor Q7 provides a constant current source to the bandgap reference circuit 120 through bipolar transistors Q3 and Q8.

The current source and bandgap reference voltage circuit illustrated in FIG. 5 also comprises a start-up circuit. The start-up circuit within the current source is required because the bandgap reference voltage controls the current source which, in turn, controls the bandgap reference voltage. Therefore, an equilibrium between the bandgap reference voltage and the current source circuit is required to ensure the proper operation of the thermal sensor. The start-up circuit contains P-MOS transistors Q6, Q9 and Q10. The P-MOS transistor Q9 is configured such that the gate is coupled directly to the drain. In this configuration, the P-MOS transistor Q9 operates as a load resistor. In general, the start-up circuit generates a voltage for the bandgap reference voltage circuit during initial power-up of the thermal sensor. Specifically, during an initial power-up of the thermal sensor circuit, transistors Q5, Q7, Q10, and Q15 are biased such that no current flows through the respective devices. Also, during the initial power-up state, the P-MOS transistor Q9 is biased to conduct current thereby supplying a low voltage level to the gate of P-MOS transistor Q6. A low voltage level at the gate of P-MOS transistor Q6 biases the P-MOS transistor Q6 such that current flows from the Vcc to bipolar transistors Q3 and Q8. The P-MOS transistor Q6 biases the base of bipolar transistor Q8 allowing generation of the bandgap reference voltage.

An increase in the bandgap reference voltage driving the base of bipolar transistor Q4 causes current to flow from the emitter of Q4 through resistor R4. As the current density increases through transistors Q5 and Q10, the voltage at the gate of transistor Q6 also increases. The build up of charge at the gate of transistor Q6 is facilitated by a large resistance generated by the load transistor Q9. As the voltage at the gate of P-MOS transistor Q6 raises to the pinch-off threshold voltage of the device, the P-MOS transistor Q6 conducts no current such that current is no longer supplied to bipolar transistors Q3 and Q8. Because of the gain provided at the emitter of bipolar transistor Q8, current continues to increase in the bandgap reference voltage circuit until the collector of bipolar transistor Q3 begins to control the base of bipolar transistor Q8. At this point, the circuit has reached an equilibrium such that the constant bandgap reference voltage generated supplies a constant voltage to the current source. Also shown in FIG. 5 is a disable P-MOS transistor Q21. The P-MOS transistor Q21 powers down, or disables, the thermal sensor circuit for testing. The P-MOS transistor Q21 is utilized only for disabling, and it is not required to generate the constant current source or the bandgap reference voltage. The P-MOS transistor Q15 isolates the collector of bipolar transistor Q11 on the programmable $V_{be}$ circuit from the Vcc on the current source circuit.

Figure 6:
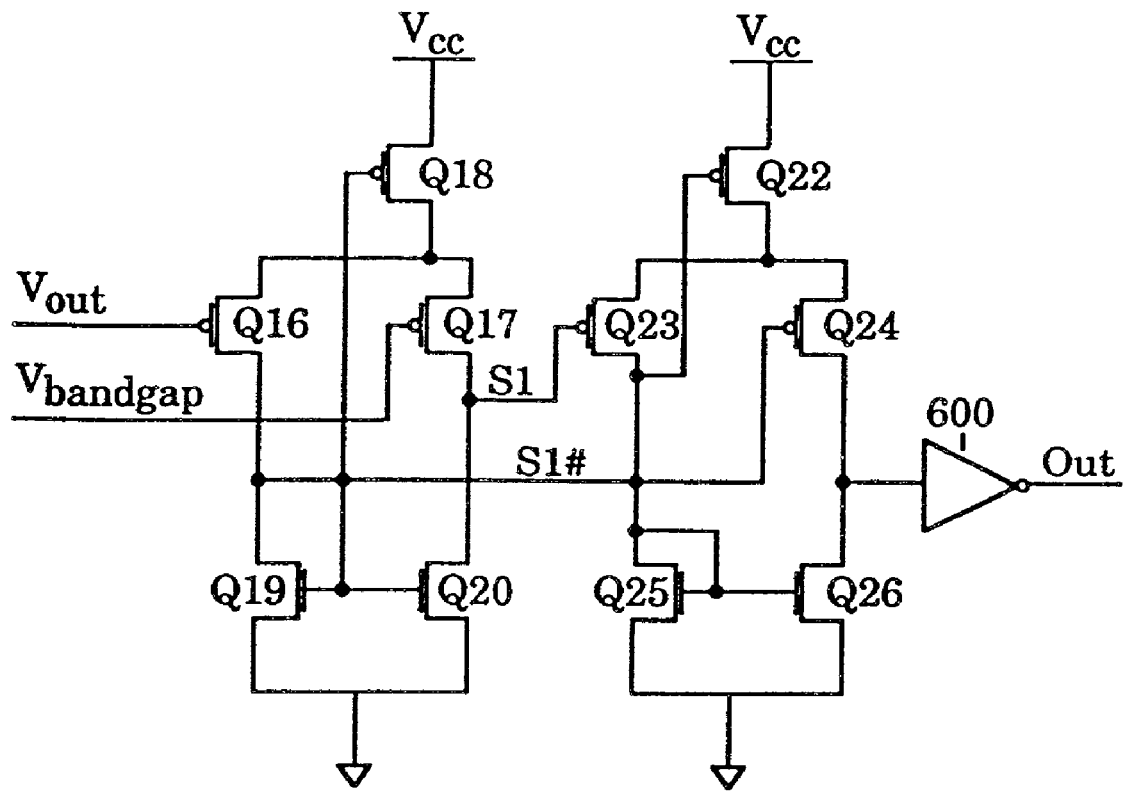
FIG. 6 illustrates a sense amplifier for the thermal sensor configured in accordance with the present invention.

Referring to FIG. 6, a sense amplifier for the thermal sensor configured in accordance with the present invention is illustrated. In a preferred embodiment of the present invention, a sense amplifier 160 contains three stages. The first stage and the second stage are identical. The third stage comprises a current buffer 600. The current buffer 600 is illustrated in FIG. 6 as a standard logic inverter. In general, the sense amplifier 160 operates as a comparator circuit. In operation, if the $V_{bandgap}$ is greater than the $V_{out}$ voltage, then the output of sense amplifier 160 is a low logic level. Alternatively, if the $V_{out}$ is greater than the $V_{bandgap}$ voltage, then the output of sense amplifier 160 is a high logic level. The second stage of sense amplifier 160 generates a voltage gain of signals on lines S1 and S1#. The first stage contains PMOS transistors Q16, Q17 and Q18, and NMOS transistors Q19 and Q20. The transistors Q19 and Q20 are constructed as a current mirror.

The voltage $V_{out}$ is input to the gate of PMOS transistor Q16, and the voltage $V_{gap}$ is input to the gate of PMOS transistor Q17. In operation, if the voltage $V_{out}$ is greater than the $V_{bandgap}$, then PMOS transistor Q17 is biased to conduct more current than PMOS transistor Q16. Because a greater current density flows through PMOS transistor Q17 than PMOS transistor Q16, the voltage at line S1 rises and the voltage at line S1# decreases. The source and gate of NMOS transistor Q19 are connected, and the source/gate connection is controlled by the voltage at S1#. Consequently, when the voltage at line S1# decreases, NMOS transistor Q19 is biased to reduce the current density flow. The voltage on line S1# is input to the gate of PMOS transistor Q18. As the voltage on line S1# decreases, the PMOS transistor Q18 is biased to conduct a greater current density. The increase in current density through transistor Q18 further amplifies the voltage difference between lines S1 and S1#. When the $V_{be}$ voltage is less than the $V_{gap}$ voltage, the first stage of the sense amplifier 160 operates in an analogous manner.

The second stage of sense amplifier 160 comprises PMOS transistors Q22, Q23 and Q24, and NMOS transistors Q25 and Q26. The operation of the second stage of the sense amplifier 160 is analogous to the operation of the first stage. In addition, hysteresis is provided for the sense amplifier 160 via a feedback path from the output of sense amplifier 160 to the programmable $V_{be}$ circuit $V_{out}$ input of sense amplifier 160. The hysteresis provides a more stable output signal from the sense amplifier 160 such that voltage variations on the inputs of the sense amplifier 160 after generation of a high output voltage level does not cause glitches in the output signal.

For the programmable thermal sensor of the present invention to operate well over process variations, the resistors are constructed to have a width larger than the minimum specification for the resistive value. All bipolar transistors in the programmable thermal sensor contain at least double width emitters. For the MOS transistors, long channel lengths are constructed. The long channel lengths of the MOS transistors help stabilize the programmable thermal sensor as well as provide noise immunity. For the bandgap reference circuit 120, the bipolar transistor Q2 is constructed to be ten times greater in size than the bipolar transistor Q1. The large size differential between bipolar transistors Q1 and Q2 provides a stable bandgap voltage reference.

Figure 7:
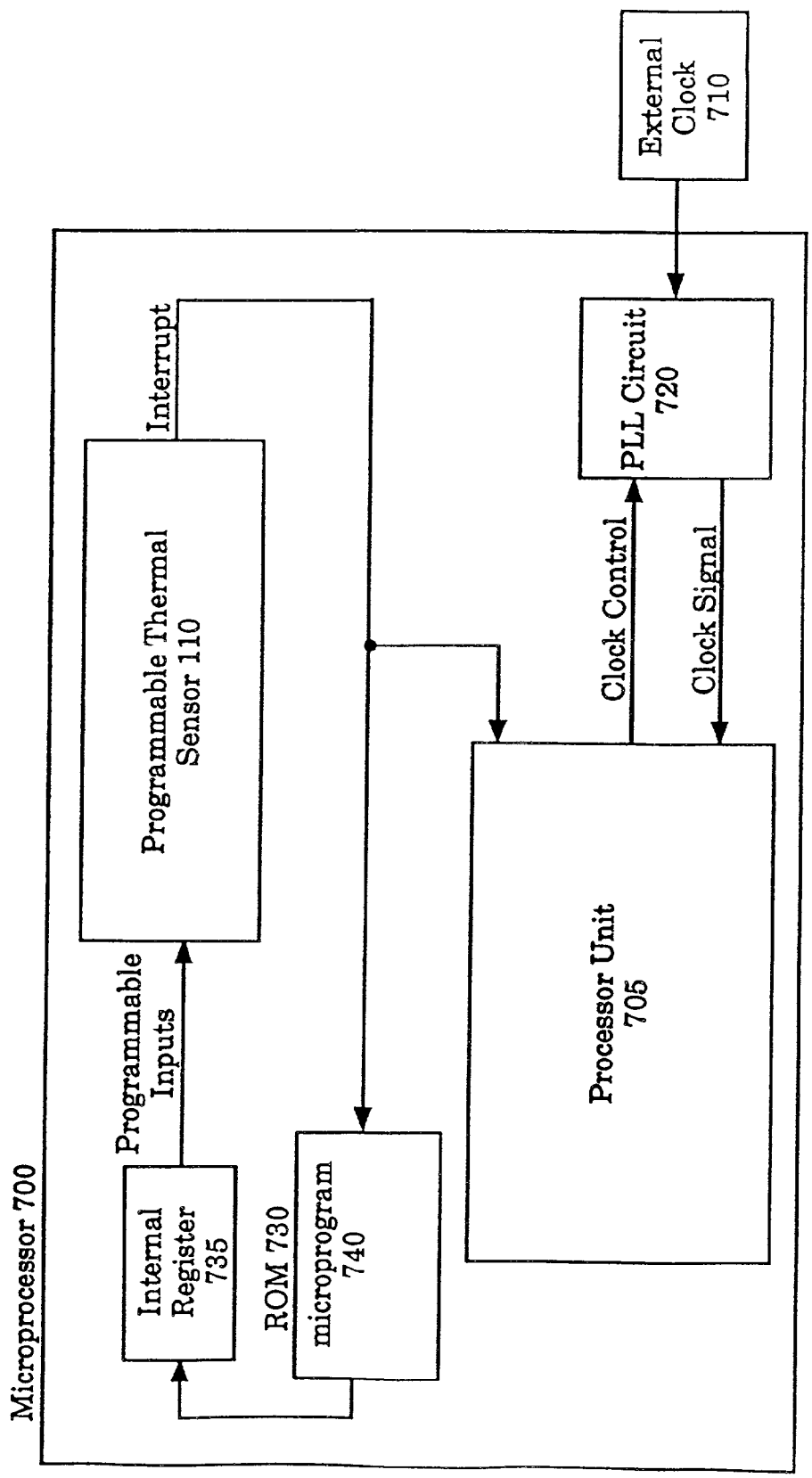
FIG. 7 illustrates block diagram of a first embodiment of a microprocessor incorporating a programmable thermal sensor configured in accordance with the present invention.

Referring to FIG. 7, a first embodiment of a microprocessor incorporating a programmable thermal sensor configured in accordance with the present invention is illustrated. A microprocessor 700 contains, in part, the programmable thermal sensor 100 and a processor unit 705. The processor unit 705 is intended to present a broad category of microprocessor circuits comprising a wide range of microprocessor functions. In general, the programmable thermal sensor 100 is programmed to detect a threshold temperature within the microprocessor 100. If the microprocessor 700 attains the pre-programmed threshold temperature, the programmable thermal sensor 100 generates an interrupt. As described above, the programmable thermal sensor 100 detects the pre-programmed threshold temperature based on the temperature of the integrated circuit at the programmable thermal sensor 100. The temperature across a microprocessor die can vary as much as 8° F. In a preferred embodiment of the present invention, the programmable thermal sensor 100 is located in the middle of the die of microprocessor 700 so as to provide the best thermal sensing. However, placement of the programmable thermal sensor in the middle of the die increases noise in the microprocessor. In an alternative embodiment, several thermal sensors are placed across the microprocessor die. In this configuration, each thermal sensor provides an interrupt when attaining the threshold temperature, and an average temperature is calculated based on the several thermal sensors.

In addition to the programmable thermal sensor 100 and processor unit 705, a microprocessor 700 contains an internal register 735, a read only memory (ROM) 730, and a phase lock loop (PLL) circuit 720. External to the microprocessor 700 is an external clock 710. The external clock 710 provides a clock signal to the PLL circuit 720. The PLL circuit 720 permits fine tuning and variable frequency adjustment of the input clock signal. Specifically, the PLL circuit 720 receives a value, and increases or decreases the frequency based on the value received. The PLL circuit 720 is intended to represent a broad category of frequency adjustment circuits, which are well known in the art and will not be described further. The output of the PLL circuit 720 is the microprocessor system clock, and is input to the processor unit 705.

The programmable thermal sensor 100 is coupled to the ROM 730 and internal register 735. The ROM 730 contains a microprogram consisting of a plurality of microcode instructions. The operation of the microprogram within the microprocessor 700 is described more fully below. In general, the microprogram 740 writes values representing the threshold temperature in the internal register 735. The internal register 735 stores the threshold temperature values and is coupled to the programmable $V_{be}$ circuit 110. For example, in a preferred embodiment of the present invention, the Vp1, Vp2 and Vp3 voltage values stored in the internal register 735 are used to program the programmable $V_{be}$ circuit 110 in the manner as described above. However, the present invention is not limited to three input voltage values in that any number of values may be stored in the internal register 735 to program any number of threshold temperatures. When the microprocessor 700 attains the threshold temperature, the programmable threshold sensor generates a comparator signal via sense amplifier 160 as described above. The comparison signal is labeled as "interrupt" on FIG. 7. The interrupt is input to the ROM 730 and the processor unit 705.

In response to the interrupt, the microprogram 740 generates new values representing a new threshold temperature. The microprogram writes the new values to the internal register 735. For example, if the programmable thermal sensor generates an interrupt based on a threshold temperature of 100°° F., then the microprogram may write values to the internal register 735 to represent a threshold temperature of 110 F. In the first embodiment, the processor unit 705 receives the interrupt signal as a standard hardware interrupt input. In response to the interrupt, the processor unit 705 generates a clock control value for the PLL circuit 720. The clock signal value reduces the microprocessor system clock frequency.

If the interrupt is again generated in response to the microprocessor 700 attaining the new threshold temperature value, the microprogram 740 writes a new temperature threshold value to the internal register 735, and the processor unit 705 further reduces the microprocessor system clock frequency. In addition, the processor unit 705 may set a standard timer circuit such that if a pre-determined amount of time elapses, then the processor unit 705 increases the clock frequency. Increasing the clock frequency permits the processor unit 705 to increase performance when the temperature of the microprocessor has decreased. In addition, to detect further decreases in the microprocessor temperature, the microprogram 740 may lower the threshold temperature and the processor unit may further increase the clock frequency. Therefore, the programmable thermal sensor of the present invention is utilized to control the temperature by increasing and decreasing the microprocessor clock frequency.

Figure 8:
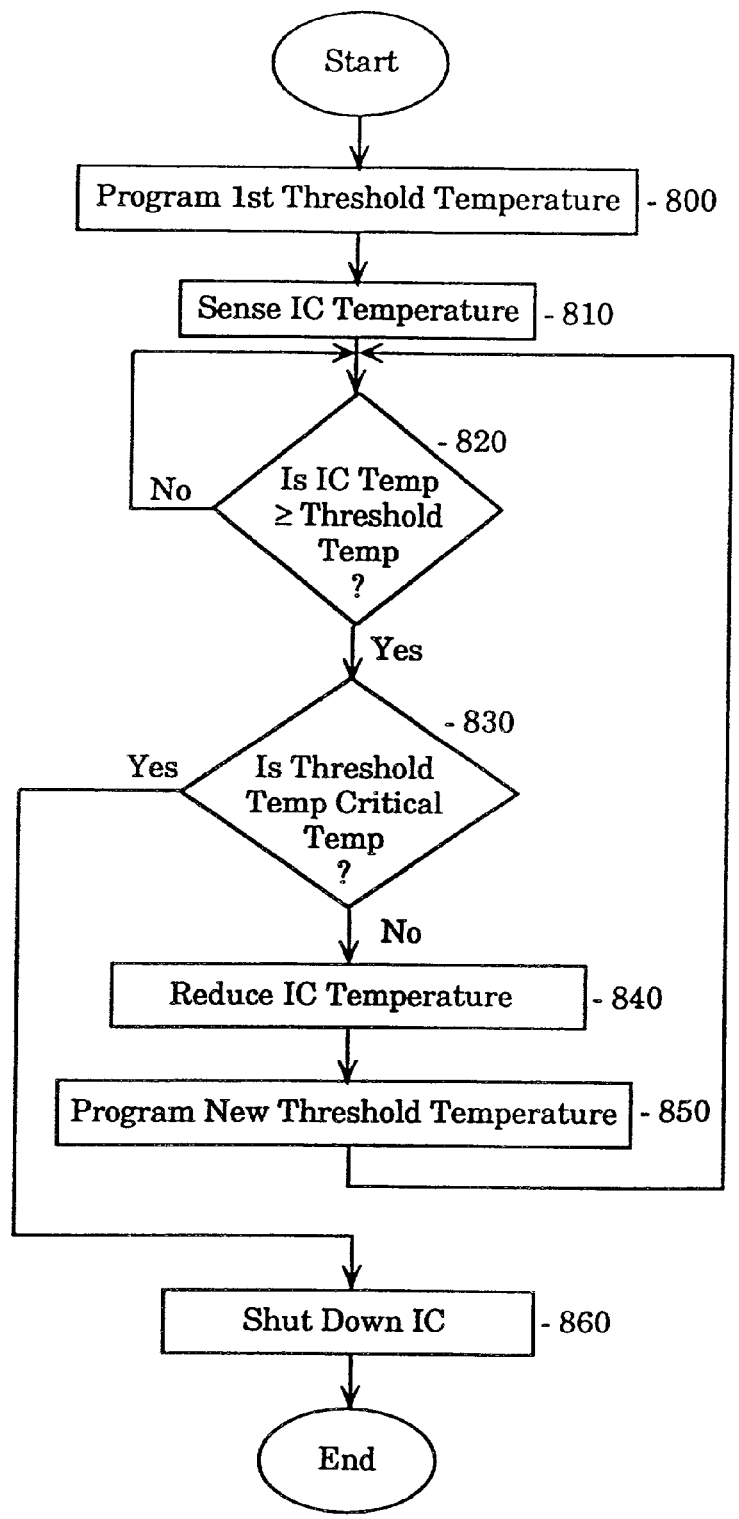
FIG. 8 illustrates a flow diagram for a method of controlling the programmable thermal sensor configured in accordance with the present invention.

Referring to FIG. 8, a flow diagram for a method of controlling the programmable thermal sensor configured in accordance with the present invention is illustrated. The method illustrated in the flow chart of FIG. 8 may be a microprogram such as microprogram 740 stored in ROM 730. Upon initialization of the microprocessor, a first threshold temperature is programmed into the programmable thermal sensor as shown in step 800. Although the present invention is described in conjunction with a microprocessor integrated circuit, one skilled in the art will appreciate that the thermal sensor of the present invention may be incorporated into any integrated circuit. The temperature of the integrated circuit is sensed as shown in step 810. The sensing of the integrated circuit may be performed by the programmable thermal sensor 110 of the present invention. The integrated circuit sensor determines whether the temperature of the integrated circuit equals the first threshold temperature. If the integrated circuit temperature is equal to or greater than the threshold temperature, then the threshold temperature is compared to a critical temperature as shown in step 830.

The critical temperature is defined as the maximum temperature that the integrated circuit may attain before the integrated circuit is physically damaged. If the threshold temperature is equal to the critical temperature, then the integrated circuit is shut down as shown in step 860. Alternatively, if the threshold temperature is less than the critical temperature, then steps are taken to reduce the temperature in the integrated circuit as shown in step 840. For example, in a microprocessor integrated circuit, the microprocessor system clock frequency is reduced. In addition to reducing the system clock frequency, a message to a system user reporting the temperature of the integrated circuit is generated. By informing the user with the temperature information, the user may take steps external to the integrated circuit to facilitate cooling. Next, a new threshold temperature is programmed in the thermal sensor as shown in step 850. The process continues wherein the thermal sensor senses the integrated circuit temperature to detect if the integrated circuit temperature reaches the new threshold temperature, and based on the threshold temperature set, either shuts down the power to the integrated circuit or executes steps to reduce the temperature.

Figure 9:
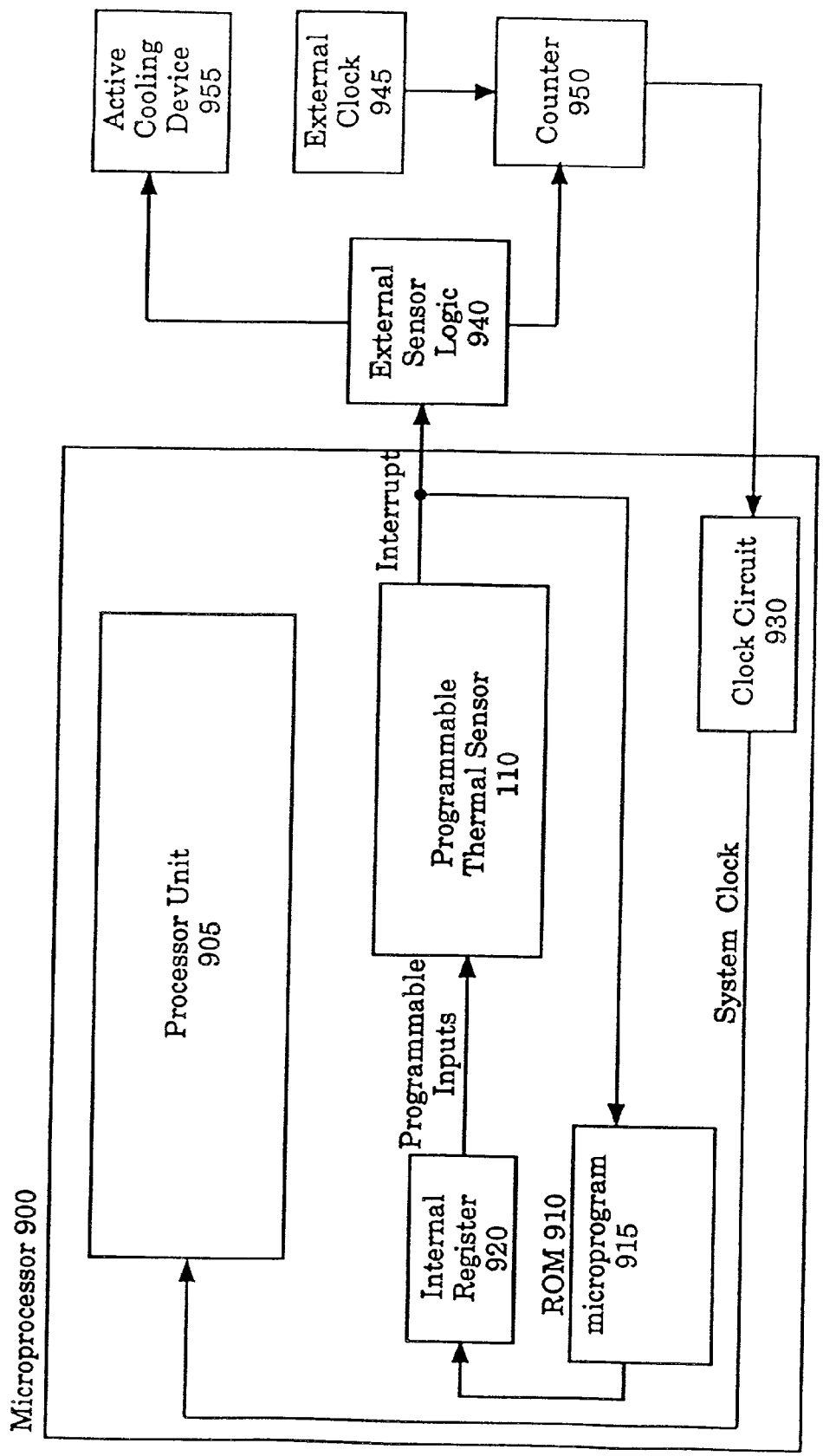
FIG. 9 illustrates a block diagram of a second embodiment of a microprocessor incorporating a programmable thermal sensor configured in accordance with the present invention.

Referring to FIG. 9, a block diagram of a programmable thermal sensor system configured in accordance with a second embodiment of the present invention is illustrated. A microprocessor 900 comprises, in part, a programmable thermal sensor 110 and a processor unit 905. The programmable thermal sensor 110 is configured as described above. The programmable thermal sensor 110 is connected to a ROM 910 and an internal register 920. The programmable thermal sensor 110 is also coupled to external sensor logic 940. The external sensor logic 940 is coupled to a counter 950 and an active cooling device 955. An external clock 945 is input to a counter 950, and the output of the counter 950 is input to a clock circuit 930. The clock circuit 930 buffers the input clock frequency to generate the microprocessor clock for the processor unit 905. In operation, a microprogram 915, stored in ROM 910, sets the internal register 920 to an initial threshold temperature value. If the temperature of the microprocessor 900 rises to the threshold temperature, an interrupt signal is generated to the external sensor logic 940.

Upon receipt of the interrupt to the external sensor logic 940, the external sensor logic 940 programs a value to the counter 950, and activates the active cooling device 955. The active cooling device 955 may comprise a fan or other heat dissipating device. To activate the active cooling device 955, the external sensor logic 940 generates a signal to turn on the active cooling device 955 by any number of well known methods. The counter 950 is configured as a frequency divider such that a clock frequency, from the external clock 945, is input. The counter 950 generates a new clock frequency based on the counter value. The programming of a counter, such as counter 950, for use as a frequency divider is well known in the art and will not be described further. As one skilled in the art will recognize, the amount in which the clock frequency may be reduced is a function of the counter selected. The slower clock frequency is input to the clock circuit 930. The clock circuit 930 may perform a variety of functions such as buffering, clock distribution, and phase tuning. The system clock comprises a reduced frequency to facilitate the cooling of the device. In addition to triggering the external sensor logic 940, the programmable thermal sensor also interrupts the microprogram 915. Upon receiving the interrupt, the microprogram 915 programs the internal register 920 to sense a new threshold temperature. If the microprocessor 900 heats up to the new threshold temperature, the external sensor logic 940 is again triggered, and the system clock frequency is further reduced. The configuration illustrated in FIG. 9 provides closed loop control of the microprocessor system clock frequency, thereby automatically reducing the temperature when overheating occurs.

Figure 10:
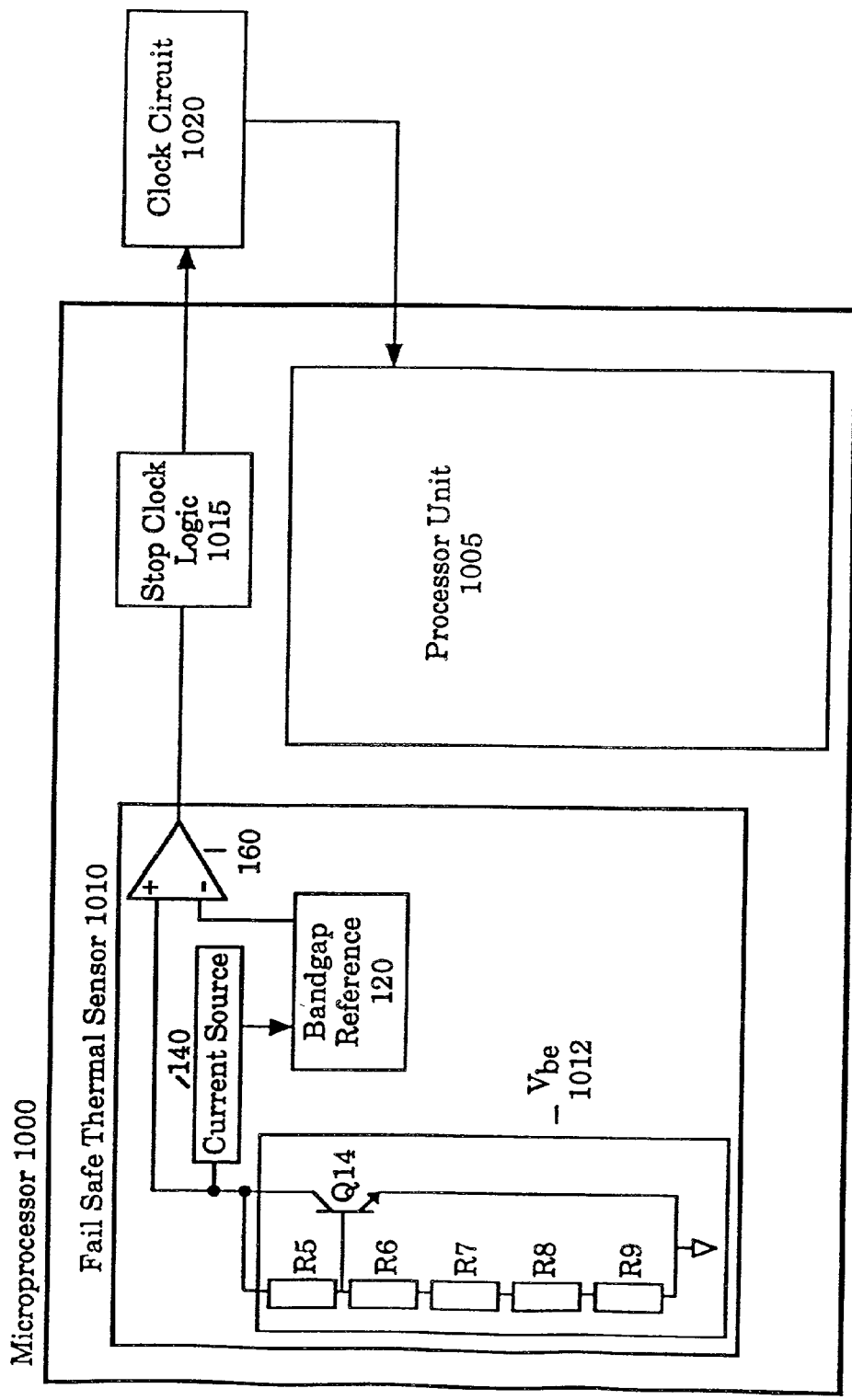
FIG. 10 illustrates a block diagram of a microprocessor incorporating a fail safe thermal sensor configured in accordance with the present invention.

Referring to FIG. 10, a block diagram of a fail safe thermal sensor configured in accordance with the present invention is illustrated. A fail safe thermal sensor 1010 is incorporated into a microprocessor 1000. Although the fail safe thermal sensor 1010 is incorporated into the microprocessor 1000, one skilled in the art will appreciate the fail safe thermal sensor may be incorporated into any integrated circuit. The fail safe thermal sensor 1010 contains a $V_{be}$ circuit 1012, a bandgap voltage reference circuit 120, a current source 140, and a sense amplifier 160. The bandgap voltage reference circuit 120, the current source 140 and the sense amplifier 160 operate in accordance with the respective circuits described above. The $V_{be}$ reference circuit 1012 is equivalent to the programmable $V_{be}$ circuit 110, except that the resistive value ratio is fixed. In the $V_{be}$ circuit 1012, the output $V_{be}$ voltage is fixed based on resistive values R5, R6, R7, R8 and R9. In a preferred embodiment of the present invention, the resistive values R5, R6, R7, R8 and R9 are fixed to the critical temperature. Consequently, the fail safe thermal circuit 1010 generates an interrupt when the temperature of the microprocessor 1000 attains the pre-programmed fixed critical temperature.

The output of the fail safe thermal sensor 1010 is connected to stop clock logic 1015. The stop clock logic 1015 is coupled to the microprocessor clock circuit 1020. Upon receipt of the interrupt of the fail safe thermal sensor 1010, the stop clock logic 1015 halts operation of the microprocessor 1000 by inhibiting the microprocessor clock. In addition, the stop clock logic 1015 ensures that the microprocessor 1000 finishes a system cycle completely. The stop clock logic 1015 therefore protects loss of data when an interrupt is generated during a microprocessor clock cycle. A microprocessor clock circuit 1012 may comprise a simple clock oscillator or a more complex and controllable clock generator. The fail safe thermal sensor 1010 prohibits the microprocessor 1000 from attaining a critical temperature, thereby protecting the device without software control.

Figure 11:
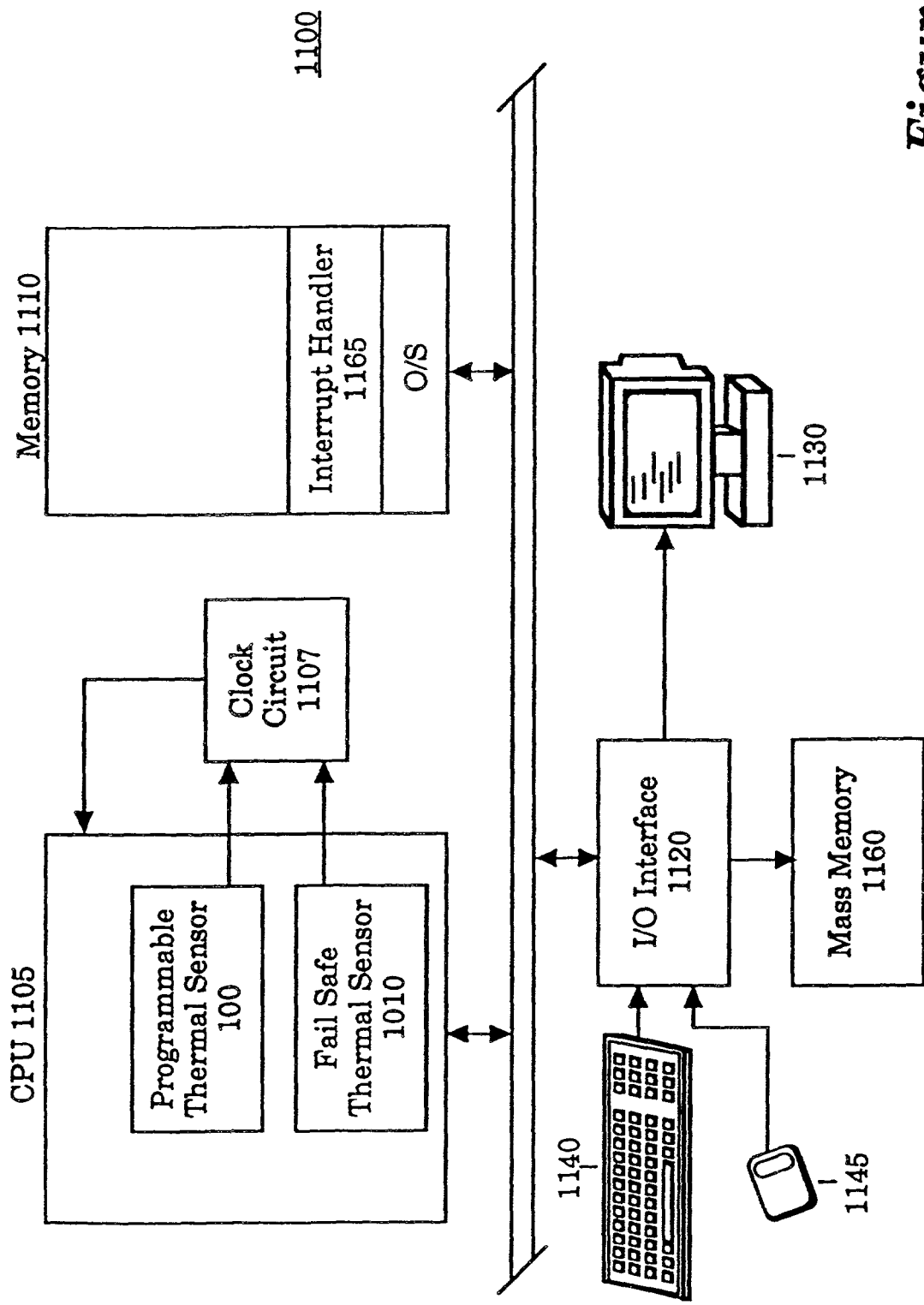
FIG. 11 illustrates a computer system incorporating a microprocessor comprising thermal sensing configured in accordance with the present invention.

Referring to FIG. 11, a computer system incorporating a microprocessor comprising thermal sensing configured in accordance with the present invention is illustrated. A computer system 1100 contains a central processing unit (CPU) 1105 incorporating the programmable thermal sensor 100 and the fail safe thermal sensor 1010. In a preferred embodiment, the CPU comprises a compatible Intel microprocessor architecture, manufactured by Intel Corporation, the assignee of the present invention. The computer system 1100 also contains memory 1110 and an I/O interface 1120. The I/O interface 1120 is coupled to an output display 1130 and input devices 1140 and 1145. In addition, I/O interface 1120 is coupled to a mass memory device 1160. The CPU 1105, memory 1110, I/O interface 1120, output device 1130, and input devices 1140 and 1145 are those components typically found in a computer system, and, in fact, the computer system 1100 is intended to represent a broad category of data processing devices. The memory 1110 stores software for operation of the computer system 1100. Specifically, memory 1110 stores, in part, an operating system and an interrupt handler routine for operation in conjunction with the thermal sensor.

Upon generation of an interrupt in the programmable thermal sensor 100 or the fail safe thermal sensor 1010, the interrupt handler routine 1165 is executed. The calling of an interrupt handler routine upon generation of a hardware interrupt in a microprocessor is well-known in the art and will not be described further. In general, the interrupt handler routine 1165 generates a message to the output display 1130. The message informs the user of the computer system 1100 that the microprocessor 1105 has attained the threshold temperature. In response, a user may alter external environmental conditions to facilitate cooling of the CPU 1105. As described above, the CPU 1105 sets a new threshold temperature for the programmable thermal sensor. If the CPU 1105 temperature rises to the new threshold temperature, another interrupt is generated. Again, the interrupt handler routine 1165 is called to generate a message to the user on output display 1130. If the temperature reaches a critical temperature for which the fail safe thermal sensor is programmed, then the fail safe thermal sensor generates an interrupt to shut down the CPU 1105.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An integrated circuit comprising:
   a register to store a threshold temperature value;
   a thermal sensor; and
   clock adjustment logic to decrease a clock frequency in response to the thermal sensor indicating that the threshold temperature value has been exceeded, the clock adjustment logic further to increase the clock frequency in response to passage of a predetermined amount of time following the decrease in clock frequency.

2. The integrated circuit of claim 1 further comprising:
   a fail-safe sensor and halt logic to halt operation of the integrated circuit in response to the fail-safe sensor indicating that a fail-safe threshold temperature has been exceeded.

3. The integrated circuit of claim 2 wherein the halt logic comprises logic to inhibit operation of the integrated circuit by stopping a clock of the integrated circuit.

4. The integrated circuit of claim 2 wherein the fail-safe threshold temperature is a predetermined fixed critical temperature.

5. The integrated circuit of claim 1 further comprising:
   an interrupt handler to display information regarding the sensed temperature to a user of the integrated circuit.

6. The integrated circuit of claim 1 wherein the clock adjustment logic executes instructions to vary the frequency of a clock signal of the integrated circuit in response to the thermal sensor.

7. The integrated circuit of claim 1 wherein the clock adjustment logic executes instructions to provide closed loop control of the integrated circuit clock frequency, thereby automatically reducing the temperature when overheating occurs.

8. The integrated circuit of claim 1 further comprising:
   interrupt logic to activate an active cooling device in response to the thermal sensor.

9. An integrated circuit comprising:
   a register to store a threshold temperature value;
   a thermal sensor;
   clock adjustment logic to decrease a clock frequency in response to the thermal sensor indicating that the threshold temperature value has been exceeded, the clock adjustment logic further to increase the clock frequency in response to one of passage of a predetermined amount of time following the decrease in clock frequency and the thermal sensor indicating that the sensed temperature is less than the threshold temperature value; and
   threshold adjustment logic to increase the threshold temperature value to a new threshold temperature value in response to the thermal sensor indicating that the threshold temperature value has been exceeded.

10. The integrated circuit of claim 9 wherein the threshold adjustment logic comprises logic to increase the new threshold temperature value in response to the thermal sensor indicating that the new threshold temperature value has been exceeded.

11. The integrated circuit of claim 10 wherein the threshold adjustment logic comprises logic to lower the new threshold temperature value to detect decreases in temperature.

12. An integrated circuit comprising:
   a register to store a threshold temperature value;
   a thermal sensor; and
   clock adjustment logic to decrease a clock frequency in response to the thermal sensor indicating that the threshold temperature value has been exceeded, the clock adjustment logic further to increase the clock frequency in response to one of passage of a predetermined amount of time following the decrease in clock frequency and the thermal sensor indicating that the sensed temperature is less than the threshold temperature value, wherein the thermal sensor comprises a plurality of thermal sensors placed across the integrated circuit and an averaging mechanism to calculate an average temperature from the plurality of thermal sensors.

13. The integrated circuit of claim 12 further comprising:
interrupt logic to generate a first interrupt if the calculated average temperature exceeds a first threshold and a second interrupt if the calculated average temperature exceeds a second threshold.

14. A method comprising:
storing a threshold temperature value in a register of an integrated circuit;
sensing the temperature within the integrated circuit;
decreasing a clock frequency of the integrated circuit in response to the sensed temperature exceeding the threshold temperature value; and
increasing the clock frequency in response to passage of a predetermined amount of time following the decrease in clock frequency.

15. The method of claim 14 further comprising displaying information regarding the sensed temperature to a user of the integrated circuit.

16. The method of claim 14 further comprising executing instructions to vary the frequency of a clock signal of the integrated circuit in response to the sensed temperature.

17. The method of claim 14 further comprising executing instructions to provide closed loop control of the integrated circuit clock frequency, thereby automatically reducing the temperature when overheating occurs.

18. A method comprising:
storing a threshold temperature value in a register of an integrated circuit;
sensing the temperature within the integrated circuit;
decreasing a clock frequency of the integrated circuit in response to the sensed temperature exceeding the threshold temperature value;
increasing the clock frequency in response to one of passage of a predetermined amount of time following the decrease in clock frequency and sensing that the temperature within the integrated circuit is less than the threshold temperature value; and
increasing the threshold temperature value to a new threshold temperature value in response to the sensed temperature exceeding the threshold temperature value.

19. The method of claim 18 further comprising increasing the new threshold temperature value in response to the sensed temperature exceeding the threshold temperature value.

20. The method of claim 18 further comprising lowering the new threshold temperature value to detect decreases in temperature.

21. A microprocessor comprising:
a register to store a register value corresponding to a threshold temperature;
a programmable thermal sensor to receive the register value, wherein the programmable thermal sensor is to generate a first interrupt signal in response to an internal microprocessor temperature exceeding the threshold temperature corresponding to the register value;
clock circuitry to provide a clock signal for the microprocessor;
a processor unit coupled to the clock circuitry, wherein the processor unit executes instructions to reduce a frequency of the clock signal in response to the first interrupt signal; and
a fail-safe thermal sensor generating a fail-safe interrupt signal if the microprocessor temperature exceeds a fail-safe threshold temperature, wherein the processor unit is halted in response to the fail-safe interrupt signal,
wherein the clock circuitry further comprises a phase locked loop.

22. A microprocessor comprising:
a register to store a register value corresponding to a threshold temperature;
a programmable thermal sensor to receive the register value, wherein the programmable thermal sensor is to generate a first interrupt signal in response to an internal microprocessor temperature exceeding the threshold temperature corresponding to the register value;
clock circuitry to provide a clock signal for the microprocessor;
a processor unit coupled to the clock circuitry, wherein the processor unit executes instructions to reduce a frequency of the clock signal in response to the first interrupt signal; and
a fail-safe thermal sensor generating a fail-safe interrupt signal if the microprocessor temperature exceeds a fail-safe threshold temperature, wherein the processor unit is halted in response to the fail-safe interrupt signal,
wherein the thermal sensor comprises:
a current source;
a voltage reference coupled to the current source to provide a bandgap reference voltage, wherein the bandgap reference voltage is substantially constant over a range of temperatures;
programmable circuitry providing an output voltage varying with the microprocessor temperature in accordance with the register value; and
a comparator, wherein the comparator generates the first interrupt signal if a difference between the output voltage and the bandgap reference voltage indicates that the threshold temperature has been exceeded.

23. The microprocessor of claim 22 wherein the programmable circuitry further comprises:
a transistor coupled to the current source to provide the output voltage, a gain ratio of the output voltage to a junction voltage of the transistor controlled by a transistor bias, wherein the junction voltage varies in accordance with a junction temperature of the transistor, the junction temperature corresponding to the microprocessor temperature, a bias circuit providing the transistor bias to control the gain ratio, wherein the output voltage varies with the microprocessor temperature in accordance with the register value.

24. The microprocessor of claim 23 wherein the bias circuit further comprises binary weighted resistors.

25. A microprocessor comprising:
a register to store a register value corresponding to a threshold temperature;
a programmable thermal sensor to receive the register value, wherein the programmable thermal sensor is to generate a first interrupt signal in response to an internal microprocessor temperature exceeding the threshold temperature corresponding to the register value;
clock circuitry to provide a clock signal for the microprocessor; and a processor unit coupled to the clock circuitry, wherein the processor unit executes instructions to reduce a frequency of the clock signal in response to the first interrupt signal, wherein the clock circuitry includes a frequency divider to provide the clock signal, the frequency divider reducing a frequency of the clock signal in response to the first interrupt signal, and wherein the processor unit executes instructions to provide closed loop control of the microprocessor clock frequency, thereby automatically reducing the temperature when overheating occurs.

26. A microprocessor comprising:

a register to store a register value corresponding to a threshold temperature;

a programmable thermal sensor to receive the register value, wherein the programmable thermal sensor is to generate a first interrupt signal in response to an internal microprocessor temperature exceeding the threshold temperature corresponding to the register value;

clock circuitry to provide a clock signal for the microprocessor; and a processor unit coupled to the clock circuitry, wherein the processor unit executes instructions to reduce a frequency of the clock signal in response to the first interrupt signal, and wherein the processor unit programs the register with another register value corresponding to another threshold temperature in response to the first interrupt signal.

27. A method of controlling a temperature of a microprocessor, comprising:

storing threshold temperature values in a register of the microprocessor;

generating a temperature signal within the microprocessor indicative of the temperature of the microprocessor;

comparing the temperature signal with a first threshold temperature level within the microprocessor;

generating an interrupt signal if the temperature signal indicates that the first threshold temperature level has been exceeded;

decreasing a microprocessor clock frequency in response to the interrupt signal; and increasing the microprocessor clock frequency in response to passage of a predetermined amount of time following the decrease in microprocessor clock frequency.

28. The method of claim 27 further comprising:

generating a fail-safe interrupt signal if the microprocessor temperature exceeds a fail-safe threshold temperature; and halting the microprocessor in response to the fail-safe interrupt signal.

29. The method of claim 27 further comprising providing closed loop control of the microprocessor clock frequency, thereby automatically reducing the temperature when overheating occurs.

30. The method of claim 27 further comprising programming the microprocessor with a second threshold temperature level.

31. A method of controlling a temperature of a microprocessor, comprising:

storing threshold temperature values in a register of the microprocessor;

generating a temperature signal within the microprocessor indicative of the temperature of the microprocessor;

comparing the temperature signal with a first threshold temperature level within the microprocessor;

generating an interrupt signal if the temperature signal indicates that the first threshold temperature level has been exceeded;

decreasing a microprocessor clock frequency in response to the interrupt signal; and increasing the microprocessor clock frequency in response to one of passage of a predetermined amount of time following the decrease in microprocessor clock frequency, and the temperature signal indicating that the temperature of the microprocessor is less than the first threshold temperature level;

comparing the temperature signal with a second threshold temperature level, wherein the second threshold temperature level represents a fail-safe temperature; and halting the microprocessor, if the temperature signal indicates that the second threshold temperature level has been exceeded.

32. A method of controlling a temperature of a microprocessor, comprising:

storing threshold temperature values in a register of the microprocessor;

generating a temperature signal within the microprocessor indicative of the temperature of the microprocessor;

comparing the temperature signal with a first threshold temperature level within the microprocessor;

generating an interrupt signal if the temperature signal indicates that the first threshold temperature level has been exceeded;

decreasing a microprocessor clock frequency in response to the interrupt signal; and increasing the microprocessor clock frequency in response to one of passage of a predetermined amount of time following the decrease in microprocessor clock frequency, and the temperature signal indicating that the temperature of the microprocessor is less than the first threshold temperature level, wherein generating a temperature signal comprises:

providing a bandgap reference voltage, that is substantially constant over a range of temperatures;

providing an output voltage varying with the microprocessor temperature in accordance with a stored register value; and wherein generating an interrupt signal comprises generating the interrupt signal if a difference between the output voltage and the bandgap reference voltage indicates that the first threshold temperature level has been exceeded.

* * * * *